United States Patent
Matsunaga

(10) Patent No.: US 11,669,268 B2
(45) Date of Patent: Jun. 6, 2023

(54) INFORMATION PROCESSING APPARATUS AND CONTROL METHOD THEREFOR

(71) Applicant: CANON KABUSHIKI KAISHA, Tokyo (JP)

(72) Inventor: Daisuke Matsunaga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/143,460

(22) Filed: Jan. 7, 2021

(65) Prior Publication Data
US 2021/0216240 A1 Jul. 15, 2021

(30) Foreign Application Priority Data
Jan. 14, 2020 (JP) ............................. JP2020-003817

(51) Int. Cl.
G06F 3/06 (2006.01)
(52) U.S. Cl.
CPC ............ G06F 3/0656 (2013.01); G06F 3/061 (2013.01); G06F 3/0679 (2013.01)
(58) Field of Classification Search
CPC ....... G06F 3/0656; G06F 3/061; G06F 3/0679
See application file for complete search history.

(56) References Cited

U.S. PATENT DOCUMENTS

| 6,134,630 | A * | 10/2000 | McDonald | G06F 3/061 711/105 |
|---|---|---|---|---|
| 2006/0195666 | A1* | 8/2006 | Maruyama | G06F 3/067 711/162 |
| 2013/0054892 | A1 | 2/2013 | Kannari | |
| 2013/0219089 | A1* | 8/2013 | Shibata | G06F 5/14 710/53 |
| 2014/0136887 | A1* | 5/2014 | Murakami | G06F 3/0689 714/6.32 |
| 2017/0131917 | A1* | 5/2017 | Yun | G06F 3/0656 |
| 2017/0242822 | A1* | 8/2017 | Malladi | G06F 3/065 |
| 2017/0277602 | A1* | 9/2017 | Kumar | G06F 16/164 |
| 2017/0285940 | A1* | 10/2017 | Benisty | G06F 3/067 |
| 2018/0101450 | A1* | 4/2018 | Park | G06F 11/1469 |
| 2018/0101456 | A1* | 4/2018 | Critchley | G06F 11/2087 |
| 2021/0326280 | A1* | 10/2021 | Lee | G06F 13/385 |

FOREIGN PATENT DOCUMENTS

JP 2013050755 A 3/2013

* cited by examiner

*Primary Examiner* — Nanci N Wong
(74) *Attorney, Agent, or Firm* — Rossi, Kimms & McDowell LLP

(57) ABSTRACT

An information processing apparatus which implements a rebuild process for restoring a mirroring state even when each of a plurality of connected external storage devices is configured to input and output data to and from a host controller by accessing a storage area of the host controller. When the host controller has issued an instruction to carry out the rebuild process in which data in one of the external storage devices is copied to the other one, one of the external storage devices which is about to write data to the storage area of the host controller for the rebuild process is caused to write the data to the buffer provided in the bridge device, and the other one which is about to read data from the storage area of the host controller for the rebuild process is caused to read the data from the buffer.

9 Claims, 18 Drawing Sheets

FIG. 11

| | COMMAND NOTIFICATION FLAG | |
|---|---|---|
| FIRST EXTERNAL STORAGE DEVICE | 1 | ~1003 |
| SECOND EXTERNAL STORAGE DEVICE | 1 | ~1004 |

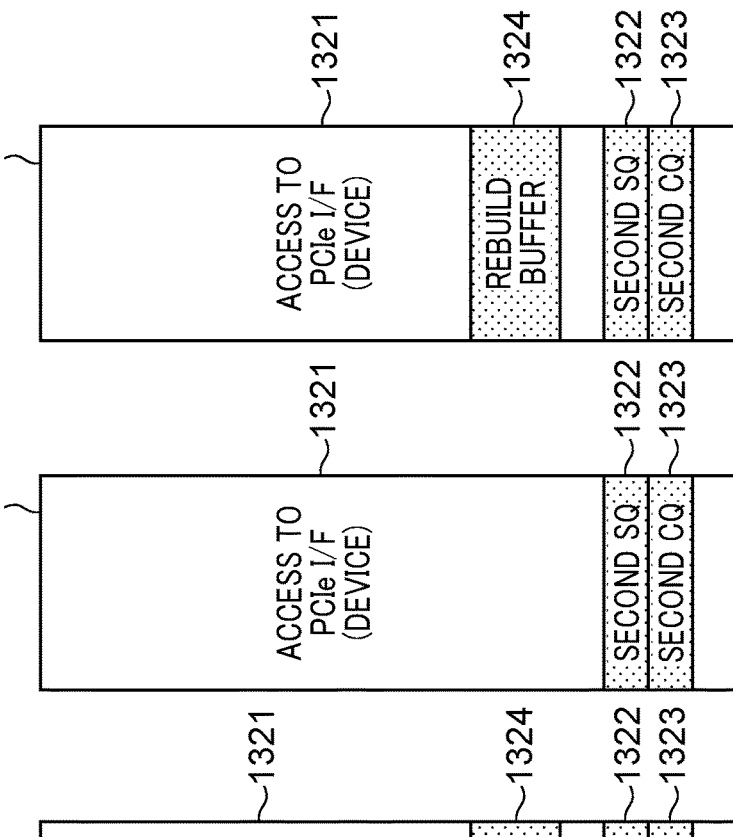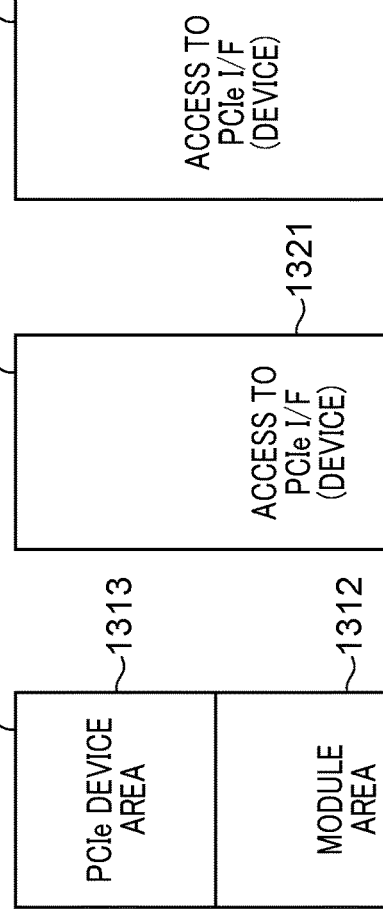
FIG. 12A  FIG. 12B  FIG. 12C  FIG. 12D  FIG. 12E

FIG. 15A
STORAGE AREA OF HOST CONTROLLER SEEN FROM BRIDGE DEVICE

- 1301
- 1313 — PCIe DEVICE AREA
- 1312 — MODULE AREA
- 1311 — MEM AREA
- 1314 — HOST SQ
- 1315 — HOST CQ

FIG. 15B
STORAGE AREA SEEN FROM FIRST EXTERNAL STORAGE DEVICE

- 1302'
- 1601 — REBUILD BUFFER
- 1321 — ACCESS TO PCIe I/F (DEVICE)
- 1322 — SQ
- 1323 — CQ

FIG. 15C
STORAGE AREA SEEN FROM SECOND EXTERNAL STORAGE DEVICE

- 1304'
- 1601 — REBUILD BUFFER
- 1602
- 1321 — ACCESS TO PCIe I/F (DEVICE)
- 1322 — SQ
- 1323 — CQ

INFORMATION PROCESSING APPARATUS AND CONTROL METHOD THEREFOR

BACKGROUND OF THE INVENTION

Field of the Invention

The present invention relates to an information processing apparatus and a control method therefor.

Description of the Related Art

Some information processing apparatuses such as an image forming apparatus, a PC, or the like, connect a plurality of hard disk drives (HDDs) to a RAID controller and store duplicate data by mirroring. Japanese Laid-Open Patent Publication (Kokai) No. 2013-050755 discloses a rebuild process in which after one of a plurality of the HDDs connected to the RAID controller is replaced with a new HDD, data is copied from the other one of the HDDs to the new HDD to restore a mirroring state.

In the information processing apparatuses, external storage devices such as solid-state drives (SSDs) using non-volatile memory has begun to be used in place of the HDDs. Capacities of the SSDs have been increasing, and they have been increasingly using the PCI-Express (PCIe) interface in place of the Serial ATA (SATA) interface so as to input and output data at higher speed. In particular, there is the Non-Volatile Memory Express (NVMe) protocol for the PCIe interface. According to the MVMe protocol, a controller of the SSD accesses a storage area of a host controller to implement data input and output between the host controller and the SSD so as to execute an instruction relating to an order from the host controller. The adoption of these new interface and protocol to the SSD achieves high-speed data transfer which could not be achieved by SATA whose latency is high because larges physical overhead is required for data encoding during transfer. In this case, a bridge device is used in place of the RAID controller.

However, in a case where each of the controllers of the plurality of external storage devices accesses the storage area of the host controller through the bridge device to implement data input and output between the host controller and the SSD, the rebuild process cannot be implemented. Upon receiving a group of instructions to start rebuilding from the host controller, the RAID controller disclosed in Japanese Laid-Open Patent Publication (Kokai) No. 2013-050755 acts as a SATA bridge device and issues a read command for a predetermined sector address to a connected master HDD. The RAID controller makes read access the master HDD and receives read data at the sector address from the master HDD. The RAID controller issues a write command for the received data to a connected slave HDD. The RAID controller makes write access the slave HDD and writes the data read from the HDD to the same sector address in the slave HDD. By repeatedly performing these steps for all sector addresses in the HDD, the RAID controller carries out the rebuild process in which the data in the master HDD is copied to the slave HDD.

However, in a case where each of the controllers of the external storage devices is configured to access the storage area of the host controller through the RAID controller, the bridge device to which the plurality of external storage devices is directly connected cannot access them. The bridge device cannot substitute as the host controller and cannot write to or read to each external storage device.

Thus, the information processing apparatuses are required to implement the rebuild process even if each of the plurality of connected external storage devices is configured to input and output data to and from the host controller by accessing the storage area of the host controller.

SUMMARY OF THE INVENTION

The present invention provides an information processing apparatus and a control method therefor which implement a rebuild process for restoring a mirroring state even when each of a plurality of connected external storage devices is configured to input and output data to and from a host controller by accessing a storage area of the host controller.

Accordingly, the present invention provides an information processing apparatus to which a plurality of external storage devices, each of which implements data input and output to and from a host controller by accessing a storage area of the host controller, is connectable, the information processing apparatus comprising a bridge device configured to be connected between the host controller and the plurality of external storage devices and used for data input and output between the host controller and the plurality of external storage devices, and a buffer provided in the bridge device and configured to store data for a rebuild process in which data in one of the external storage devices connected to the bridge device is copied to the other one of the external storage devices, wherein in a case where the host controller has issued a host instruction to carry out the rebuild process for mirroring between the plurality of external storage devices, the bridge device causes one of the external storage devices, which is about to write data to the storage area of the host controller for the rebuild process, to write the data to the buffer provided in the bridge device, and causes other one of the external storage devices, which is about to read data from the storage area of the host controller for the rebuild process, to read the data from the buffer provided in the bridge device.

According to the present invention, a rebuild process for restoring a mirroring state is implemented even when each of the plurality of connected external storage devices is configured to input and output data to and from the host controller by accessing the storage area of the host controller.

Further features of the present invention will become apparent from the following description of exemplary embodiments (with reference to the attached drawings).

BRIEF DESCRIPTION OF THE DRAWINGS

FIG. 11 is a view useful in explaining command notification flags for the external storage devices.

FIGS. 12A, 12B, 12C, 12D and 12E are views useful in explaining PCIe address maps related to PCIe interfaces of the bridge device according to the first embodiment.

FIGS. 15A, 15B, and 15C are views useful in explaining PCIe address maps related to PCIe interfaces of the bridge device according to the second embodiment.

DESCRIPTION OF THE EMBODIMENTS

The present invention will now be described in detail below with reference to the accompanying drawings showing embodiments thereof.

Figure 1:
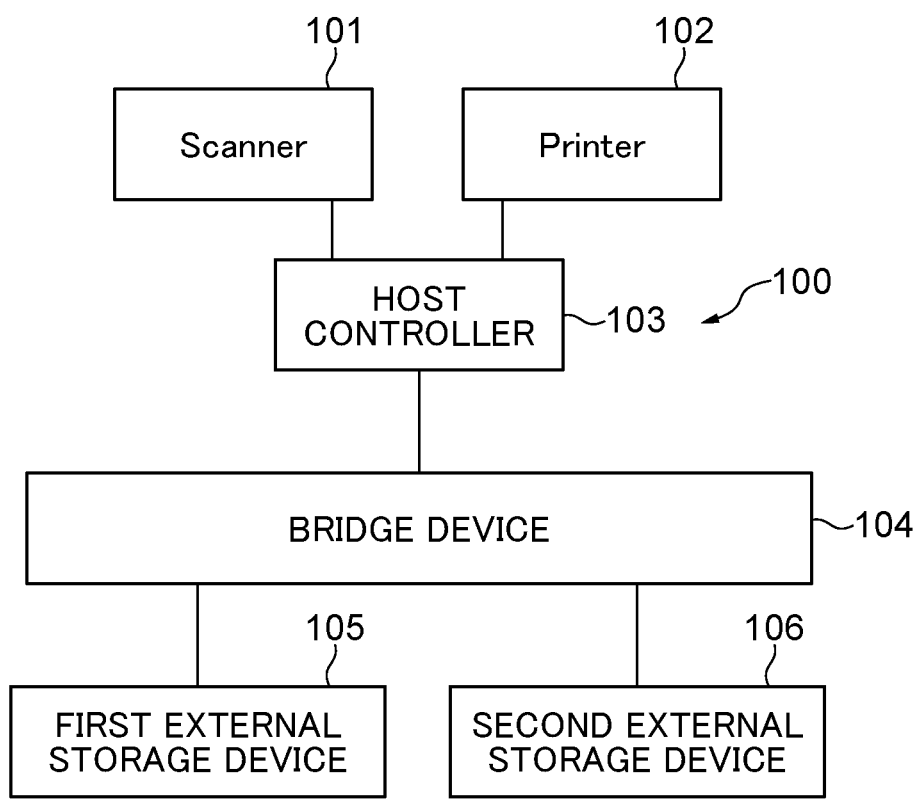
FIG. 1 is a block diagram showing a system arrangement of an image forming apparatus which is an information processing apparatus according to embodiments of the present invention.

FIG. 1 is a block diagram showing a system arrangement of an image forming apparatus 100 which is an information processing apparatus according to embodiments of the present invention. The image forming apparatus 100 has a scanner (reader) 101, a printer 102, a host controller 103, a bridge device 104, a first external storage device 105, and a second external storage device 106. The scanner 101 generates image data by reading originals. The printer 102 prints images on sheets based on image data for printing. The host controller 103 is connected to the scanner 101, the printer 102, and the bridge device 104.

The host controller 103 controls operation of the scanner 101 and the printer 102. This controls the overall operation of the image forming apparatus 100, enabling the image forming apparatus 100 to, for example, generate image data by reading an original, print an image on a sheet based on image data for printing, and copy an image on an original to a sheet. The first external storage device 105 and the second external storage device 106 are connectable to the bridge device 104. The bridge device 104, the first external storage device 105, and the second external storage device 106 constitute a memory system, which can be accessed by the host controller 102, in the image forming apparatus 100.

The first external storage device 105 and the second external storage device 106 are allowed to store, for example, the same data in duplicate. In this case, the first external storage device 105 and the second external storage device 106 constitute a mirroring system. When one of the first external storage device 105 and the second external storage device 106 fails, the failed one can be replaced with a new one, which in turn is connected to the bridge device 104. When one of the first external storage device 105 and the second external storage device 106 has been replaced with a new one, it is necessary to carry out a rebuild process in which data stored in the other one is copied to the new one. After the rebuild process is carried out, the same data is stored in the first external storage device 105 and the second external storage device 106, one of which has been replaced, in the same manner as before the replacement.

A hard disk drive (HDD), for example, is conventionally used as each of the first external storage device 105 and the second external storage device 106 which constitute the mirroring system. In this case, a RAID controller is used in place of the bridge device 104. When, for example, the host controller 103 writes (makes a write access) to the first external storage device 105, the RAID controller writes (makes a write access) to both of the first external storage device 105 and the second external storage device 106. As a result, the same data as data written to the first external storage device 105 by the host controller 103 is stored in the second external storage device 106. Namely, a mirroring state is restored.

As external storage devices, in place of the HDDs, solid state drives (SSDs) and others using non-volatile semiconductor memory have begun to be used so as to increase their reliability and achieve high-speed data input and output. An increasing number of SSDs have been using the PCI-Express (PCIe) interface in place of the SATA interface, which has higher latency due to large physical overhead being required for data encoding during data transfer.

There is the Non-Volatile Memory Express (NVMe) protocol for the PCIe interface. When the NVMe protocol is used, a controller of an SSD obtains an instruction relating to an instruction from the host controller 103 from the host controller 103 and executes the same. Based on the instruction, the controller of the SSD accesses a storage area of the host controller 103.

As a result, data input/output is implemented between the host controller 103 and the SSD. By using SSDs employing such interface and protocol, high-speed data transfer can be achieved. In this case, as shown in FIG. 1, a bridge device (circuit) is used in place of the RAID controller.

However, when each of the first external storage device 105 and the second external storage device 106 which are SSDs, accesses the storage area of the host controller 103 through the bridge device 104, the rebuild process cannot be implemented using the same technique as in a case where these external storage devices are HDDs. Namely, the rebuild process cannot be implemented in the same manner as in a case where the RAID controller and a plurality of HDDs are used in combination. As distinct from the RAID controller, the bridge device 104 is a device through which the external storage devices access the storage area of the host controller 103 and hence cannot write to and read from (make a write access to and a read access from) each of the external storage devices.

Even if this new kind of external storage devices is used, the image forming apparatus 100 is required to implement the rebuild process by taking advantage of high-speed data transfer according to the NVMe protocol or the like without increasing processing load on the host controller 103. The bridge device 104 supporting the NVMe protocol needs to synchronize accesses to a shared memory by controllers provided in respective SSDs so that rebuilding can be performed among the SSDs.

Figure 2:
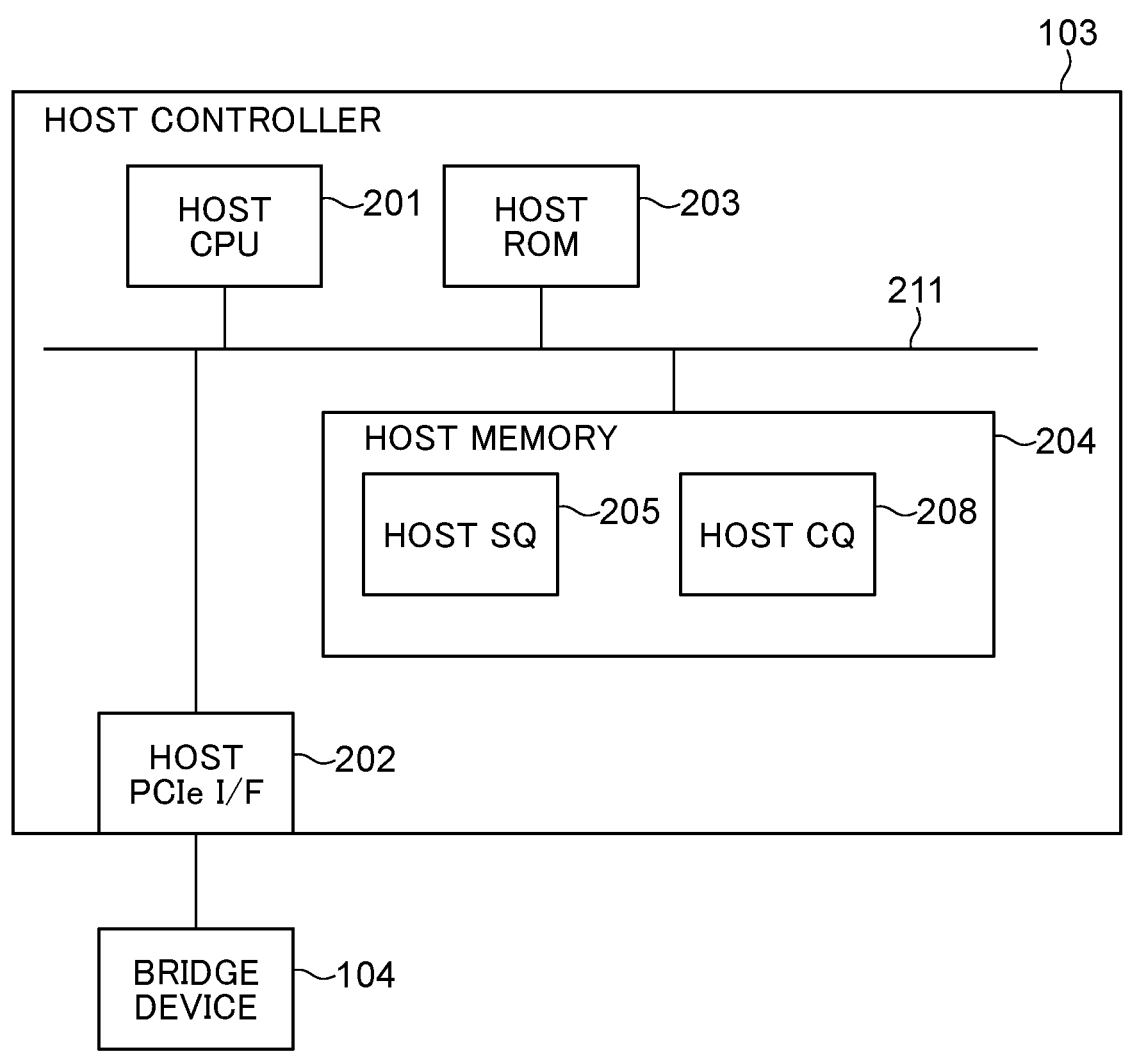
FIG. 2 is a diagram showing an arrangement of a host controller in FIG. 1.
Figure 3:
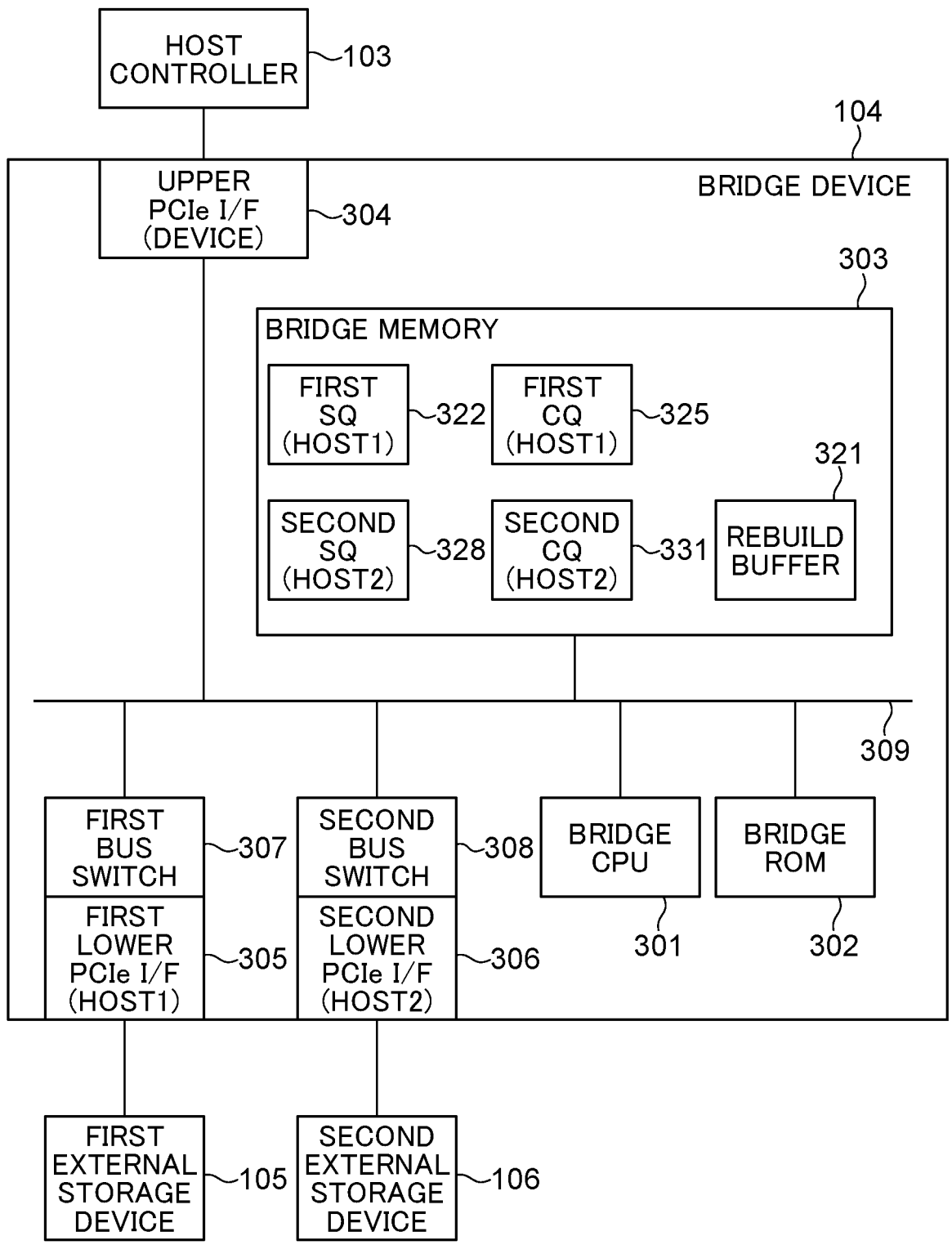
FIG. 3 is a diagram showing an arrangement of a bridge device according to a first embodiment.
Figure 4:
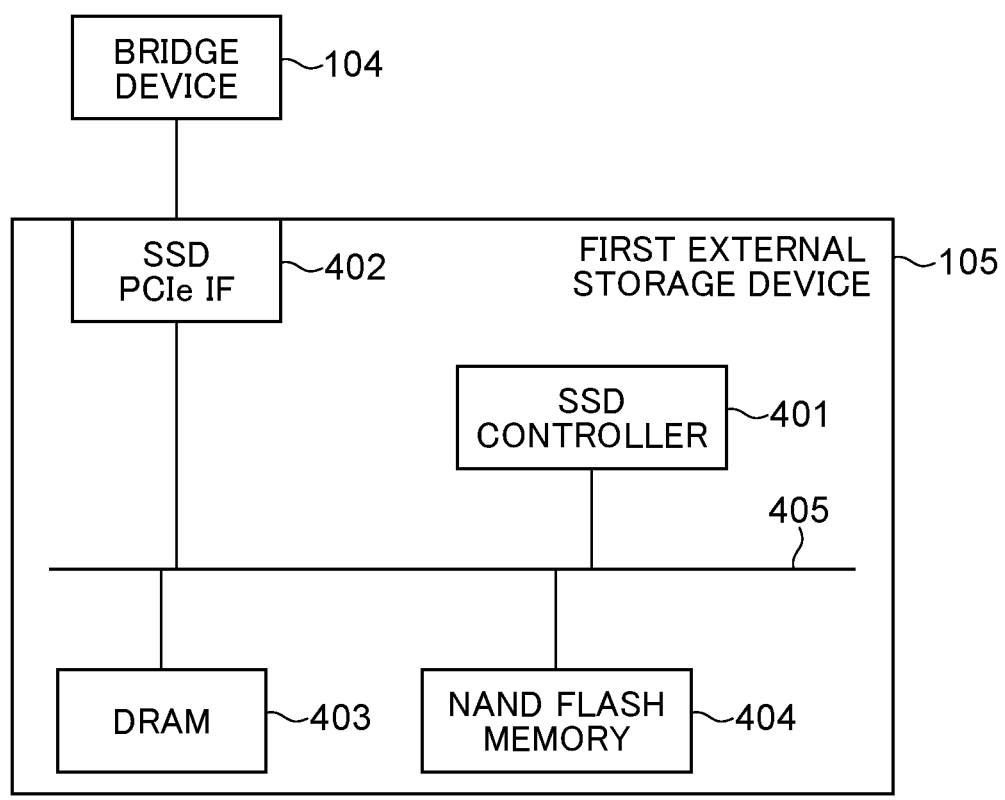
FIG. 4 is a diagram showing an arrangement of a first external storage device in FIG. 1.

FIGS. 2 to 4 are diagrams useful in explaining an arrangement of a memory system for use in the image forming apparatus 100 described above. FIG. 2 is a diagram showing an arrangement of the host controller 103 in FIG. 1. The host controller 103 in FIG. 2 has a host CPU 201, a host ROM 203, a host PCIe interface (I/F) 202, a host memory (MEM) 204, and a host bus 211 to which they are connected. The scanner 101 and the printer 102 in FIG. 1 can be connected to the host buss 211 via an interface, not shown.

The host PCIe interface (I/F) 202 is an interface conforming to the PCI-Express standard. The host PCIe I/F 202 inputs and outputs data to and from a device (here, the bridge device 104) connected thereto, by a method conforming to the NVMe protocol. The host ROM 203 is non-volatile memory and stores programs and data which are executed by the host CPU 201. The host memory 204 is volatile memory such as DRAM and used as a work memory in which temporary data is stored. The host CPU 201 reads the programs stored in the host ROM 203, expands them on the host memory 204, and executes them. The host CPU 201 thus acts as a control unit which controls the overall operation of the image forming apparatus 100.

The host CPU 201 acting as the control unit manages the memory system. The host CPU 201 provides the host memory 204 acting as the work memory with data areas for managing the memory system. Referring to FIG. 2, the host memory 204 includes a host submission queue (SQ) 205 and a host completion queue (CQ) 208, used for NVMe protocol.

The host SQ 205 is a queue of a ring buffer which is generated in the host memory 204. The host CPU 201 generates NVMe commands for data input and output to and from external storage devices of the memory system and successively stores the generated NVMe commands in the host SQ 205. A head element of the queue is managed by a head pointer 206. A tail element is managed by a tail pointer 207. Unprocessed commands are stored between locations indicated by the head pointer 206 and the tail pointer 207. When the head pointer 206 and the tail pointer 207 point to the same position, the queue is empty with no unprocessed commands remaining. The host CQ 208 is a queue of a ring buffer which is generated in the host memory 204.

Command processing completion notifications from the bridge device 104, which is an endpoint, are successively stored in the host CQ 208. A head element of the queue is managed by a head pointer 209. A tail element is managed by a tail pointer 210. Unprocessed command processing completion notifications are stored between locations indicated by the head pointer 209 and the tail pointer 210. When the head pointer 209 and the tail pointer 210 point to the same position, the queue is empty with no unprocessed command processing completion notifications remaining.

FIG. 3 is a diagram showing an arrangement of the bridge device 104 according to the first embodiment. The bridge device 104 has a bridge CPU 301, a bridge ROM 302, a bridge memory 303, a plurality of PCIe interfaces (I/F) 304 to 306, a plurality of bus switches 307 and 308, and a bridge bus 309 to which they are connected. The upper PCIe I/F 304 is connected to the host PCIe I/F 202 of the host controller 103.

The upper PCIe I/F 304 sends and receives data to and from the host controller 103 as a root complex. The first lower PCIe I/F 305 is connected to the first external storage device 105. The first lower PCIe I/F 305 sends and receives data to and from the first external storage device 105 as an endpoint. The first bus switch 307 switches access destinations of PCIe data sent from the first external storage device 105. The access destinations include the storage area of the host controller 103 through the upper PCIe I/F 304 and a storage area of the bridge memory 303.

When a controller of the first external storage device 105 makes an access for the rebuild process, the first bus switch 307 sets the access destination of the controller of the first external storage device 105 to a rebuild buffer 321, to be described later, provided in the bridge device 104. As a result, the access destination of the controller of the first external storage device 105 changes from the storage area of the host controller 103 to the rebuild buffer 321 provided in the bridge device 104.

The second lower PCIe interface I/F 306 is connected to the second external storage device 106. The second lower PCIe interface I/F 306 sends and receives data to and from the second external storage device 106 as an endpoint. The second bus switch 308 switches access destinations of PCIe data sent from the second external storage device 106. The access destinations include the storage area of the host controller 103 through the upper PCIe I/F 304 and a storage area of the bridge memory 303. When a controller of the second external storage device 106 makes an access for the rebuild process, the second bus switch 308 sets the access destination of the controller of the second external storage device 106 to the rebuild buffer 321, to be described later, provided in the bridge device 104. As a result, the access destination of the controller of the second external storage device 106 changes from the storage area of the host controller 103 to the rebuild buffer 321 provided in the bridge device 104.

Thus, the bridge device 104 is connected between the host controller 103 and the first and second external storage devices 105 and 106 by the interfaces conforming to the PCI-Express standard. The bridge device 104 enables data input and output using the NVMe protocol between the host controller 103 and the first and second external storage device 105 and 106.

The bridge ROM 302 is nonvolatile memory. The bridge ROM 302 stores programs and data which are executed by the bridge CPU 301. The bridge memory 303 is volatile memory such as DRAM. The bridge memory 303 is used as a work memory in which temporary data is stored.

The bridge CPU 301 reads the programs stored in the bridge ROM 302, expands them on the bridge memory 303, and executes them. The bridge CPU 301 thus acts as a control unit of the bridge device 104. The bridge CPU 301 acting as the control unit of the bridge device 104, for example, manages data input and output between the host controller 103 and the first and second external storage devices 105 and 106 in the memory system. The bridge CPU 301 provides the bridge memory 303 acting as the work memory, with data areas for managing data input and output using the NVMe protocol.

FIG. 3 shows a first submission queue (first SQ) 322 and a first completion queue (first CQ) 325, which are used for data input and output to and from the first external storage device 105, as well as the rebuild buffer 321. FIG. 3 also shows a second submission queue (second SQ) 328 and a second completion queue (second CQ) 331, which are used for data input and output to and from the second external storage device 106.

To carry out the rebuild process, the rebuild buffer 321 temporarily stores data for the rebuild process in which the data is copied from an unreplaced one of the first external storage device 105 and the second external storage device 106 to a replaced one of the first external storage device 105 and the second external storage device 106. The first SQ 322, the first CQ 325, the second SQ 328, and the second CQ 331 are queues of ring buffers generated in the bridge memory 303. The bridge CPU 301 of the bridge device 104 obtains a command group for the memory system from the host SQ 205 of the host controller 103 and generates a command group for the first external storage device 105 and a command group for the second external storage device 106. The bridge CPU 301 stores the generated command group for the first external storage device 105 in the first SQ 322 in the order in which they were generated. The bridge CPU 301 stores the generated command group for the second external storage device 106 in the second SQ 328 in the order in which they were generated.

After executing the command group, the first external storage device 105 which is the endpoint stores command completion notifications in the first CQ 325 in the order in which they were executed. After executing the command group, the second external storage device 106 which is the endpoint stores command completion notifications in the second CQ 331 in the order in which they were executed. The bridge CPU 301 stores the command completion notifications, which are stored in the first CQ 325 and the second CQ 331, in the host CQ 208 of the host controller 103. The bridge device 104 is used for data input and output between the host controller 103 and the first and second external storage devices 105 and 106 which are the plurality of external storage devices.

FIG. 4 is a diagram showing an arrangement of the first external storage device 105 in FIG. 1. The first external storage device 105 is, for example, an SSD. The first external storage device 105 has an SSD controller 401, an SSD PCIe interface (I/F) 402, a DRAM 403, a NAND flash memory 404, and an SSD bus 405 to which they are connected. The SSD PCIe I/F 402 is connected to the first lower PCIe interface I/F 305 of the bridge device 104. The SSD PCIe I/F 402 sends and receives data to and from the bridge device 104 as a root complex.

The NAND flash memory 404 is a device which stores data in a nonvolatile manner. The NAND flash memory 404 can store, for example, programs and data which are executed by the SSD controller 401, as well as data stored in the first external storage device 105 by the host controller 103. The DRAM 403 is a cache memory which temporarily stores data input to and output from the NAND flash memory 404.

The SSD controller 401 reads programs from, for example, the NAND flash memory 404 and executes them. The SSD controller 401 thus acts as a control unit of the first external storage device 105. The SSD controller 401 manages data input and output to and from the first external storage device 105. The SSD controller 401 manages the NAND flash memory 404 and the DRAM 403. The SSD controller 401 obtains instructions related to orders from the host controller 103 from the bridge device 104 and executes them.

The SSD controller 401 accesses the storage area of the host controller 103 through the SSD PCIe I/F 402 and the bridge device 104 to implement data input and output between the host controller 103 and the SSD (the first external storage device 105). The SSD controller 401 of the first external storage device 105 accesses the storage area of the host controller 103 through the bridge device 104 using the NVMe protocol and inputs and outputs data to and from the host controller 103. It should be noted that the second external storage device 106 in FIG. 1 may have the same SSD arrangement as that of the first external storage device 105 in FIG. 4.

Figure 5:
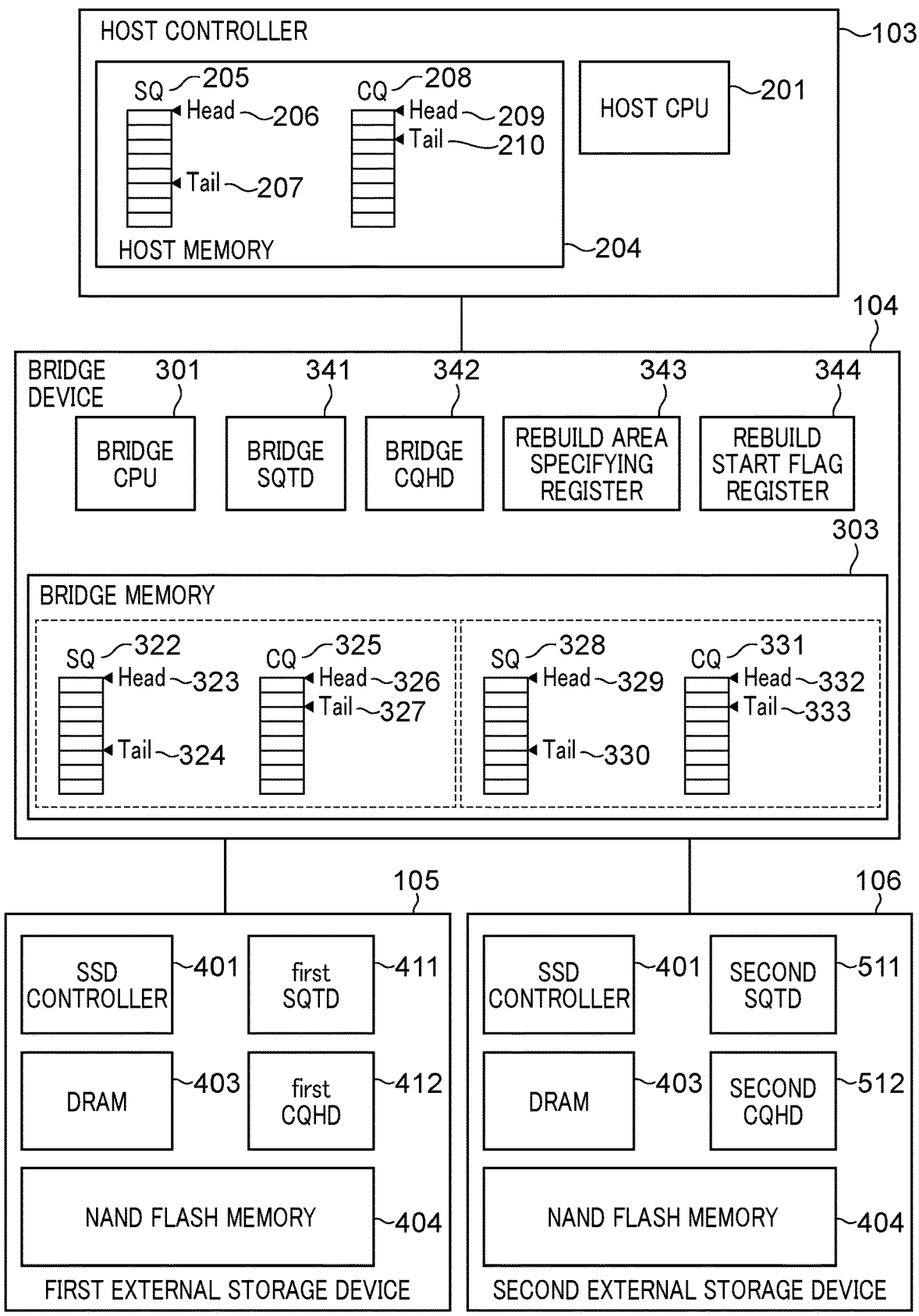
FIG. 5 is a view showing how a memory system in the image forming apparatus in FIG. 1 operates.

FIG. 5 is a diagram showing how the memory system of the image forming apparatus in FIG. 1 operates. The host controller 103 and the first and second external storage devices 105 and 106 are connected to the bridge device 104. FIG. 5 shows a state in which data is input and output between the host controller 103 and the first and second external storage devices 105 and 106 through the NVMe protocol. In this case, the host memory 204 of the host controller 103 is provided with the host SQ 205 and the host CQ 208.

The bridge memory 303 of the bridge device 104 is provided with the first SQ 322, the first CQ 325, the second SQ 328 and the second CQ 331. The first SQ 322 stores, for example, a first instruction which is generated based on a host command relating to an instruction from the host controller 103 and is executed by the controller of the first external storage device 105. The second SQ 328 stores, for example, a second instruction which is generated based on a host instruction relating to an order from the host controller 103 and is executed by the controller of the second external storage device 106.

The bridge device 104 is provided with a bridge SQTD 341, a bridge CQHD 342, a rebuild area specifying register 343, and a rebuild start flag register 344. These registers may be set as registers, not shown, of the bridge device 104. The bridge SQTD 341 is Submission Queue Tail Doorbell, in which information on the tail pointer 207 of the host SQ 205 provided from the host controller 103 is stored. The ridge CQHD 342 is Completion Queue Head Doorbell, in which information on the head pointer 209 of the host CQ 208 provided from the host controller 103 is stored.

The rebuild area specifying register 343 and the rebuild start flag register 344 are registers within the bridge device 104 and used for the rebuild process. The rebuild area specifying register 343 stores an area for the rebuild process which is carried out between the first external storage device 105 and the second external storage device 106. The rebuild area specifying register 343 may include, for example, information on a start LBA (Logical Block Address) at which rebuilding is performed, and information on a sector size (Number Of Logical Blocks).

The rebuild start flag register 344 is a flag register which is set when a rebuild start command is included in commands received from the host controller 103. When a flag is set in the rebuild start flag register 344, the bridge CPU 301 detects it and starts the rebuild process. After completing the rebuild process, the bridge CPU 301 clears the rebuild start flag register 344.

The first external storage device 105 is provided with a first SQTD 411 and a first CQHD 412. The first SQTD 411 stores information on a tail pointer 324 of the first SQ 322 which is provided from the bridge device 104. The first CQHD 412 stores information on a head pointer 326 of the first CQ 325 which is provided from the bridge device 104.

The second external storage device 106 is provided with a second SQTD 511 and a second CQHD 512. The second SQTD 511 stores information on a tail pointer 330 of the second SQ 328 which is provided from the bridge device 104. The second CQHD 512 stores information on a head pointer 332 of the second CQ 331 which is provided from the bridge device 104. The memory system of the image forming apparatus 100 uses these pieces of information to manage data input and output using the NVMe protocol between the host controller 103 and the first and second external storage devices 105 and 106 as well as the rebuild process.

A description will now be given of basic command processing by the above described memory system using the NVMe protocol. The host controller 103 generates NVMe commands so as to give instructions to write/read (to make write/read access) to and from the first external storage device 105 using the NVMe protocol and carry out the rebuild process. The host controller 103 stores the generated NVMe commands in the host SQ 205 of the host memory 204 in an order in which they were generated. Each time a new NVMe command is stored, the tail pointer 207 of the host SQ 205 is updated so as to be positioned at the tail of the NVMe commands stored in the host SQ 205.

When the tail pointer 207 is updated, the host controller 103 notifies the bridge device 104 that new NVMe commands have been generated. The host controller 103 writes a value of a final tail point 333 of the host SQ 205 to the bridge SQTD 341 of the bridge device 104. Based on the update of the value in the bridge SQTD 341, the bridge device 104 detects that the new NVMe commands have been generated in the host controller 103.

Based on the updated value in the bridge SQTD 341, the bridge device 104 pulls the newly generated NVMe commands in the host SQ 205 in turn from the position of the head pointer 206 to the position of the tail pointer 207. The bridge CPU 301 interprets the pulled NVMe commands. Then, the CPU 301 generates NVMe commands, which are to be executed by the first external storage device 105, in association with the NVMe commands the execution of which was ordered by the host controller 103, and stores the generated NVMe commands in the first SQ 322 of the bridge device 104.

The bridge CPU 301 generates NVMe commands, which are to be executed by the second external storage device 106, in association with the NVMe commands the execution of which was ordered by the host controller 103, and stores the generated NVMe commands in the second SQ 328 of the bridge device 104. The bridge CPU 301 also notifies the first external storage device 105 and the second external storage device 106 that the new NVMe commands have been generated.

Upon detecting that the new NVMe commands have been generated based on the notification, the first external storage device 105 pulls the newly generated NVMe commands in turn from the first SQ 322 of the bridge device 104. The first external storage device 105 executes the pulled NVMe commands. Upon detecting that the new NVMe commands have been generated based on the notification, the second external storage device 106 pulls the newly generated NVMe commands in turn from the second SQ 328 of the bridge device 104. The second external storage device 106 executes the pulled NVMe commands.

Figure 6:
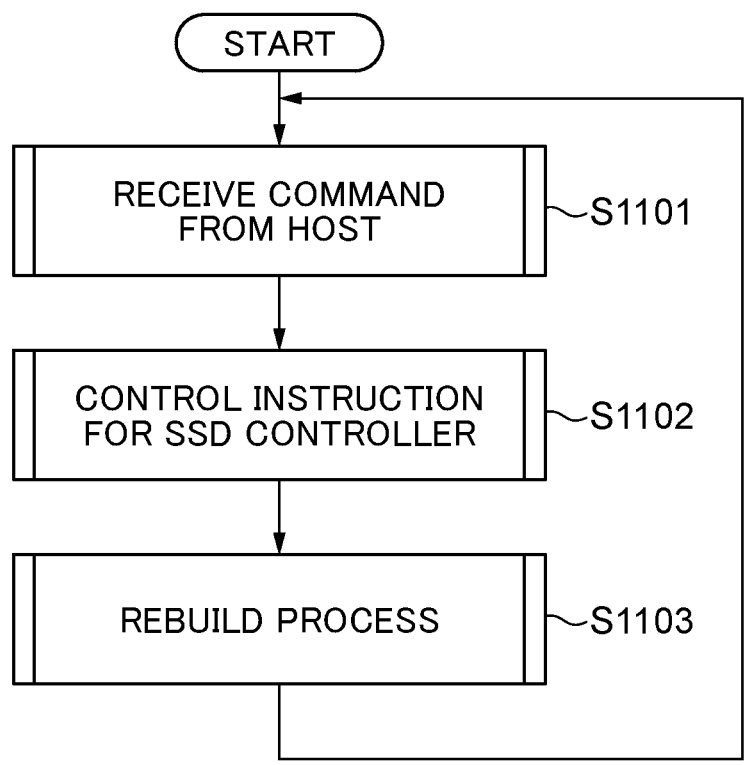
FIG. 6 is a flowchart showing a process which is carried out by a bridge CPU of the bridge device.

A description will now be given of the rebuild process as a main example of processes carried out by the memory system operating according to the NVMe protocol as described above. When accessing the first external storage device 105 and the second external storage device 106 in the memory system, the host controller 103 generates a command using the NVMe protocol, stores it in the host SQ 205, and writes a new value of the final tail point 333 in the bridge SQTD 341 of the bridge device 104. FIG. 6 is a flowchart showing a process which is carried out by the bridge CPU 301 of the bridge device 104. Upon detecting that, for example, the bridge SQTD 341 has been updated, the bridge CPU 301 of the bridge device 104 carries out the process in FIG. 6. The bridge CPU 301 may voluntarily carry out the process in FIG. 6 on a regular basis.

In step S1101, the bridge CPU 301 receives a newly generated NVMe command from the host SQ 205, which is a part of the storage area in the host controller 103. In step S1102, the bridge CPU 301 executes an instruction to control the SSD controller 401. The bridge CPU 301 interprets the received NVMe command and generates an NVMe command, which is to be executed by the first external storage device 105 or the second external storage device 106 in the memory system, in association with the interpreted NVMe command. When the received NVMe command is a command to carry out, for example, the rebuild process in which data is copied from the first external storage device 105 to the second external storage device 106, the bridge CPU 301 manages the rebuild process. The bridge CPU 301 generates a read command and a write command for the rebuild process.

The bridge CPU 301 stores the generated NVMe command in the first SQ 322 and writes a new value of the final tail point 324 to the first SQTD 411 of the first external storage device 105. The bridge CPU 301 also stores the generated NVMe command in the second SQ 328 and writes a new value of the final tail point 330 to the second SQTD 511 of the second external storage device 106. After that, the bridge CPU 301 waits for the SSD controller 401 of the first external storage device 105 and the SSD controller 401 of the second external storage device 106 to complete execution of the process. When the rebuild process has been completed, the bridge CPU 301 carries out the incomplete rebuild process in step S1103. The rebuild process is a process in which all data is copied, for example, from the first external storage device 105 to the second external storage device 106.

It takes time and load to copy all the data. For this reason, the bridge CPU 301 periodically carries out the process in FIG. 6 to suspend the rebuild process and carry out a process relating to an order from the host controller 103 by giving higher priority to it than the rebuild process. Thus, after finishing executing a process relating to an order from the host controller 103, the rebuild process that had started to be executed may still remain incomplete. The bridge CPU 301 starts the incomplete rebuild process in the step S1103.

Figure 7:
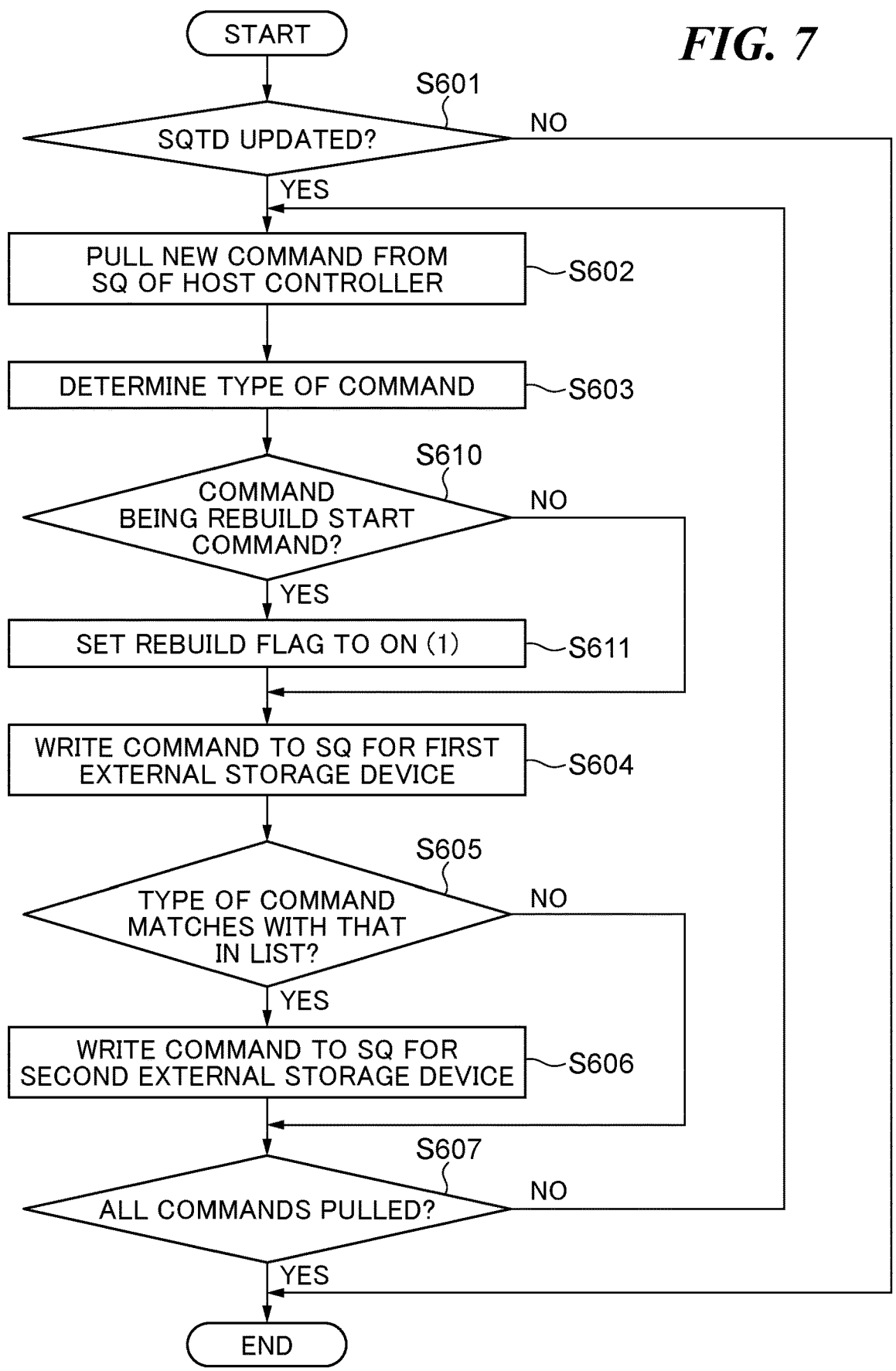
FIG. 7 is a flowchart showing a process which is carried out for a rebuild process by the bridge device according to the first embodiment.

FIG. 7 is a flowchart showing a process which is carried out in the step S1103 in FIG. 6 for the rebuild process by the bridge device 104 according to the first embodiment. In the process in FIG. 7, the bridge CPU 301 interprets a command received from the host controller 103, stores NVMe commands in the first SQ 322 and the second SQ 328 which are the storage areas of the bridge device 104, and makes a reservation to start the rebuild process.

Figure 8:
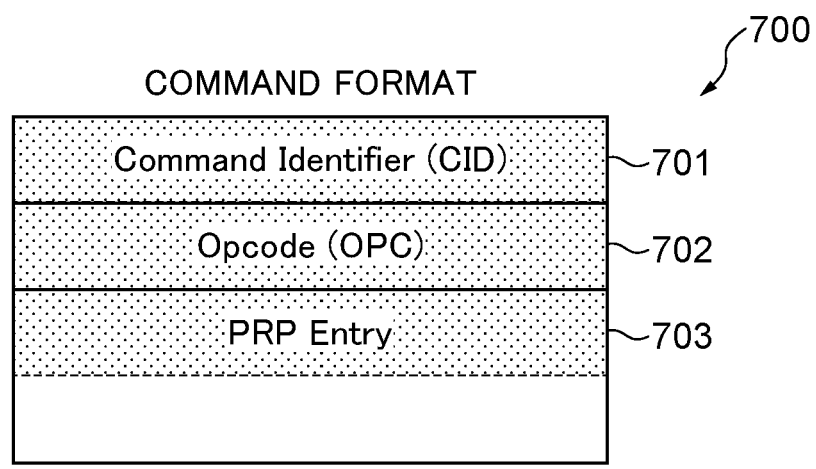
FIG. 8 is a view useful in explaining a format of a command issued by the NVMe protocol.

FIG. 8 is a view useful in explaining a format of a command issued by the NVMe protocol. An NVMe command 700 in FIG. 8 has a Command Identifier field (CID field) 701, an Opcode field (OPC field) 702, and a PRP Entry field 703. The CID field 701 stores a unique number which is added to a command. An Opcode is an identifier which indicates a type of a command. The OPC field 702 stores an identifier for each type of commands issued by the NVMe protocol such as a write command and a read command. The RPR Entry field 703 stores an address of a source or destination from or to which a command is transferred.

Figure 9:
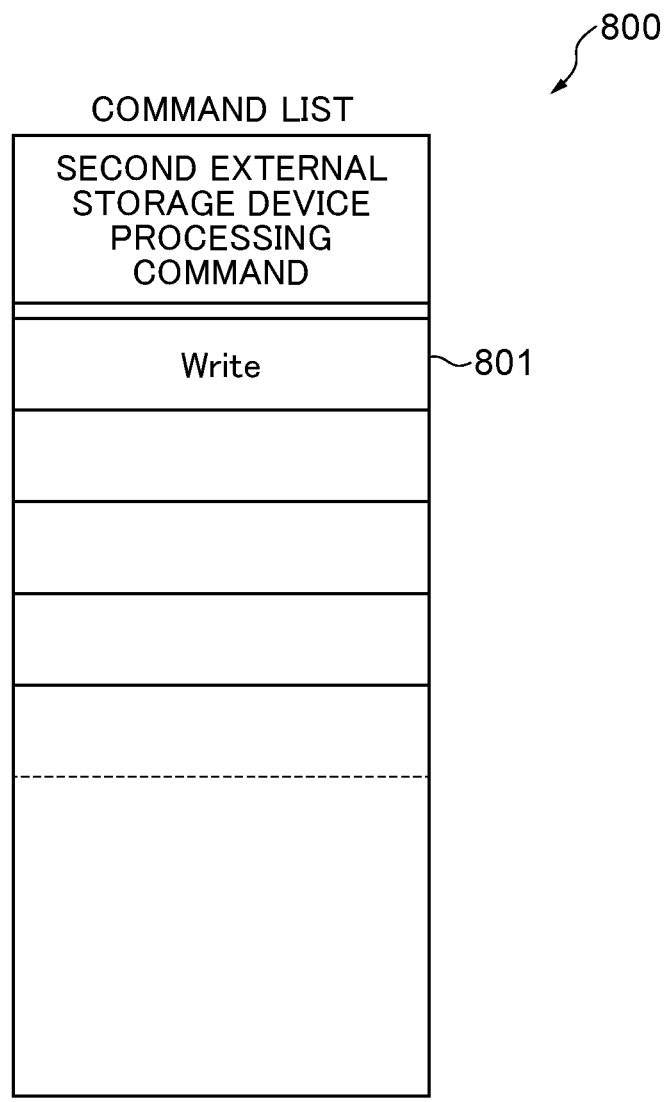
FIG. 9 is a view useful in explaining an example of a command list in which processes to be performed for a second external storage device are registered.

FIG. 9 is a view useful in explaining an example of a command list 800 in which processes to be performed for the second external storage device 106 are registered. The command list 800 can be stored in the bridge memory 303. As shown in FIG. 9, a plurality of commands to be executed for the second external storage device 106 is stored in the command list 800. A write command (WRITE) 801 is stored in a head register in FIG. 9.

In step S601 in FIG. 7, the bridge CPU 301 determines whether or not the bridge SQTD 341 of the bridge device 104 has been updated. By determining whether or not the bridge SQTD 341 of the bridge device 104 has been updated, the bridge CPU 301 determines whether or not a new NVMe command has been stored in the host SQ 205 which is the storage area of the host controller 103. When the bridge SQTD 341 has not been updated, the bridge CPU 301 ends the present process. When the bridge SQTD 341 has been updated, the process proceeds to step S602.

In the step S602, the bridge CPU 301 pulls an NVMe command, which has been newly generated by the host controller 103, from the host SQ 205 which is the storage area of the host controller 103. When a plurality of newly generated NVMe commands is stored in the host SQ 205, the bridge CPU 301 pulls these new commands one by one. In step S603, the bridge CPU 301 determines types of the pulled command. Examples of the command type include write, read, and rebuild start. The bridge CPU 301 determines the type of the command based on, for example, the OPC field 702 of the NVMe command 700. After the bridge CPU 301 determines the type of the pulled command, the process proceeds to step S610.

In the step S610, the bridge CPU 301 determines whether or not the command, the type of which was determined in the step S603, is a rebuild start command. When the bridge CPU 301 determines that the command is the rebuild start command, the process proceeds to step S611. When the command is not the rebuild start command, the process proceeds to step S604 with the step S611 being skipped. In the step S611, the bridge CPU 301 sets a rebuild start flag to on (1) so as to make a reservation to start rebuilding. Specifically, the bridge CPU 301 writes "1" in the rebuild start flag register 344 of the bridge device 104. After that, the process proceeds to the step S604.

In the step S604, the bridge CPU 301 writes an NVMe command to the first SQ 322 for the first external storage device 105. The bridge CPU 301 writes the command corresponding to the command pulled in the step S602 to the first SQ 322 so as to cause the first external storage device 105 to perform processing ordered by the pulled command. After writing the new NVMe command to the first SQ 322, the bridge CPU 301 updates the first SQTD 411 of the first external storage device 105.

In step S605, the bridge CPU 301 determines, based on the command list 800 in FIG. 9, whether or not the pulled command is a command that should be executed for the second external storage device 106. Namely, when the bridge CPU 301 determines that the pulled command is not a command of a type that is registered in the command list 800, the process proceeds to step S607. When the bridge CPU 301 determines that the pulled command is a command of a type that is registered in the command list 800, the process proceeds to step S606.

In the step S606, the bridge CPU 301 writes an NVMe command to the second SQ 328 for the second external storage device 106. The bridge CPU 301 writes the command corresponding to the command pulled in the step S602 to the second SQ 328 so as to cause the second external storage device 106 to perform processing ordered by the pulled command. After writing the new NVMe command to the second SQ 328, the bridge CPU 301 updates the second SQTD 511 of the second external storage device 106.

In the step S607, the bridge CPU 301 determines whether or not all the commands have been pulled from the host SQ 205 which is the storage area of the host controller 103. When a pointer in the host SQ 205 referred to when the command was pulled and a value in the bridge SQTD 341 are the same value, this means that all the commands including the last command stored in the host SQ 205 have been pulled by the bridge CPU 301. When the bridge CPU 301 compares these values with each other and determines that all the commands have not been pulled, the process returns to the step S602. The bridge CPU 301 repeatedly carries out the processes from the step S602 to the step S607 until all the commands have been pulled. When the bridge CPU 301 determines that all the commands have been pulled, it ends the present process.

Figure 10:
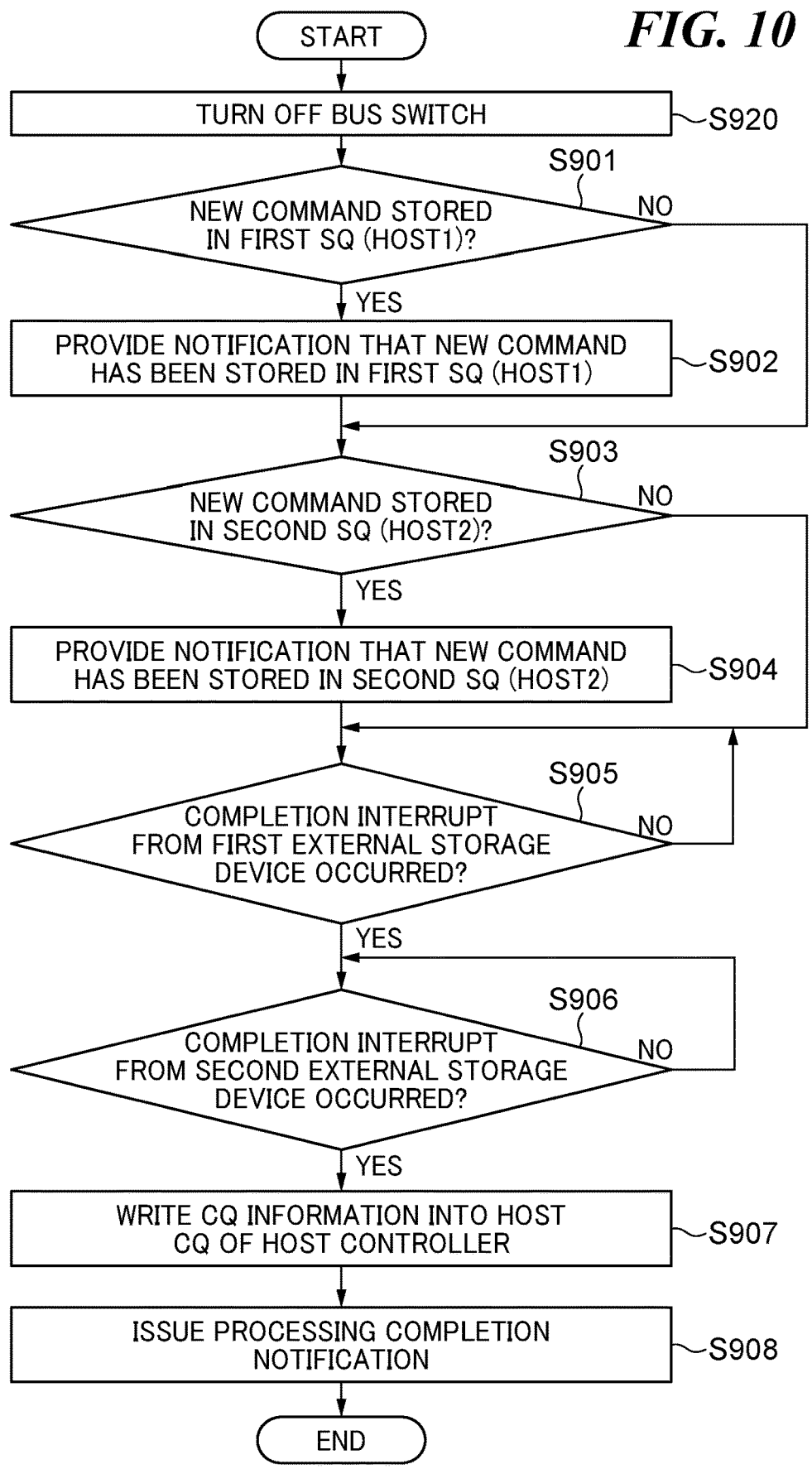
FIG. 10 is a flowchart showing a process which is carried out for the rebuild process by the bridge device according to the first embodiment.

FIG. 10 is a flowchart showing a process which is carried out in the step S1102 in FIG. 6 for the rebuild process by the bridge device 104 according to the first embodiment. FIG. 11 is a view useful in explaining command notification flags 1003 and 1004 for the external storage devices 105 and 106. As shown in FIG. 11, the command notification flags 1003 and 1004 are provided for the respective external storage devices connected to the bridge device 104. Each of the command notification flags 1003 and 1004 indicates whether or not the bridge device 104 has provided a command notification to each of the external storage devices. For example, when a notification of command processing has been provided to the second external storage devices 106, the command notification flag 1004 is on (1). When a notification of command processing has not been provided to the second external storage devices 106, the command notification flag 1004 is off (0).

FIGS. 12A, 12B, 12C, 12D and 12E are views useful in explaining PCIe address maps related to PCIe interfaces (Device, Host 1, Host 2) of the bridge device 104 according to the first embodiment. FIG. 12A shows an address map 1301 for a storage area of the host controller 103 which can be seen from the bridge device 104. The storage area of the host controller 103 is divided into three areas i.e. a MEM area 1311 of the host controller 103, a module area 1312 of the host controller 103, and a PCIe device area 1313 of the host controller 103.

The MEM area 1311 of the host controller 103 includes an area 1314 of the host SQ 205 and an area 1315 of the host CQ 208. The module area 1312 of the host controller 103 is an access area for a module register, not shown, of the host controller 103. The PCIe device area 1313 of the host controller 103 is an access area for a PCIe device connected to the host controller 103. The PCIe device area 1313 includes, for example, a register area for controlling the bridge device 104.

FIG. 12B shows an address map 1302 for a storage area on the host controller 103 side which can be seen from the first external storage device 105 in a case where the first bus switch 307 is off. Referring to FIG. 12B, the first bus switch 307 in the off state replaces a part of the storage area of the host controller 103 (FIG. 12A), which can be seen from the bridge device 104, with the first SQ 322 and the first CQ 325 of the bridge device 104 (1322, 1323). In this case, the SSD controller 401 of the first external storage device 105 accesses the storage area in FIG. 12B.

FIG. 12C shows an address map 1303 for a storage area on the host controller 103 side which can be seen from the first external storage device 105 in a case where the first bus switch 307 is on. Referring to FIG. 12C, the first bus switch 307 in the on state replaces a part of the storage area of the host controller 103 (FIG. 12A), which can be seen from the bridge device 104, additionally with the rebuild buffer 321 of the bridge device 104 (1324). In this case, the SSD controller 401 of the first external storage device 105 accesses the storage area in FIG. 12C.

FIG. 12D shows an address map 1304 for a storage area on the host controller 103 side which can be seen from the second external storage device 106 in a case where the second bus switch 308 is off. Referring to FIG. 12C, the second bus switch 308 in the off state replaces a part of the storage area of the host controller 103 (FIG. 12A), which can be seen from the bridge device 104, with the second SQ 328 and the second CQ 331 of the bridge device 104 (1322, 1323). In this case, the SSD controller 401 of the second external storage device 106 accesses the storage area in FIG. 12D.

FIG. 12E shows an address map 1305 for a storage area on the host controller 103 side which can be seen from the second external storage device 106 in a case where the second bus switch 308 is on. Referring to FIG. 12E, the second bus switch 308 in the on state replaces a part of the storage area of the host controller 103 (FIG. 12A), which can be seen from the bridge device 104, additionally with the rebuild buffer 321 of the bridge device 104 (1324). In this case, the SSD controller 401 of the second external storage device 106 accesses the storage area in FIG. 12E.

As described above, each of the address maps 1302 to 1305 in FIGS. 12B to 12E is roughly divided into two areas i.e. the white area 1321 and the dotted areas 1322 to 1324. When the first external storage device 105 or the second external storage device 106 is to access data in the white area 1321, the bridge device 104 changes its access destination to the host PCIe I/F 202 of the host controller 103. When the first external storage device 105 or the second external storage device 106 is to access data in the dotted areas 1322 to 1324, the bridge device 104 changes its access destination to the bridge memory 303. The first bus switch 307 and the second bus switch 308 perform control to switch these access destinations.

The first bus switch 307 and the second bus switch 308 are turned on and off by the bridge CPU 301 to dynamically switch the address maps. In the present embodiment, to carry out the rebuild process, the first bus switch 307 and the second bus switch 308 are turned on. The first bus switch 307 and the second bus switch 308, which are in the on state, transfer a part of data (the area 1321), which has been transferred to the upper PCIe I/F 304, to the bridge memory 303 (the area 1324).

A description will now be given of the process in FIG. 10. In step S920, the bridge CPU 301 of the bridge device 104 turns off the first bus switch 307 and the second bus switch 308. The SSD controller 401 of the first external storage device 105 accesses the storage area based on the address map 1302 in FIG. 12B. The SSD controller 401 of the second external storage device 106 accesses the storage area based on the address map 1304 in FIG. 12D.

In step S901, the bridge CPU 301 determines whether or not a new NVMe command has been stored in the first SQ 322 (Host1) of the bridge device 104. When there is a difference between a head pointer 323 and a tail pointer 324 of the first SQ 322, the bridge CPU 301 determines that the new NVMe command has been stored in the first SQ 322, and the process proceeds to step S902. There is no difference in position between those pointers, the bridge CPU 301 determines that no new NVMe command has been stored in the first SQ 322, the process proceeds to step S903.

In the step S902, the bridge CPU 301 notifies the first external storage device 105 that the new NVMe command has been stored in the first SQ 322. Namely, the bridge CPU 301 uses a Doorbell notification to write positional information on the tail pointer 324 of the first SQ 322 to the first SQTD 411 of the first external storage device 105. The bridge CPU 301 also sets the command notification flag 1003 for the first external storage device 105 to on (1) to store information that the first external storage device 105 has been requested to perform NVMe command processing.

Based on the received Doorbell notification, the SSD controller 401 of the first external storage device 105 pulls an NVMe command from the storage area of the host controller 103. The SSD controller 401 of the first external storage device 105 executes the pulled NVMe command. After completing the command processing, the SSD controller 401 of the first external storage device 105 writes a command processing completion to the first CQ 325 for the first external storage device 105 of the bridge device 104.

When execution of all commands that should be executed by the first external storage device 105 has been completed, the SSD controller 401 of the first external storage device 105 uses the MSI (Message Signaled Interrupts) to notify the bridge device 104 that the execution of all the commands has been completed. The SSD controller 401 of the first external storage device 105 reads, by a read access, a first instruction stored in the first SQ 322, which is a first instruction storage of the bridge device 104, and executes the same. The SSD controller 401 of the first external storage device 105 accesses the storage area of the host controller 103 to perform input and output of data between the host controller 103 and the SSD which is the second external storage device 106.

In the step S903, the bridge CPU 301 determines whether or not a new NVMe command has been stored in the second SQ 328 (Host2) of the bridge device 104. When there is a difference between a head pointer 329 and the tail pointer 330 of the second SQ 328, the bridge CPU 301 determines that the new NVMe command has been stored in the second SQ 328, and the process proceeds to step S904. When there is no difference in position between those pointers, the bridge CPU 301 determines that no new NVMe command has been stored in the second SQ 328, and the process proceeds to step S905.

In the step S904, the bridge CPU 301 notifies the second external storage device 106 that the new NVMe command has been stored in the second SQ 328. Namely, the bridge CPU 301 uses a Doorbell notification to write positional information on the tail pointer 330 of the second SQ 338 to the second SQTD 511 of the second external storage device 106. The bridge CPU 301 also sets the command notification flag 1004 for the second external storage device 106 to on (1) to store information that the second external storage device 106 has been requested to perform NVMe command processing.

Based on the Doorbell notification, the SSD controller 401 of the second external storage device 106 pulls an NVMe command from the storage area of the host controller 103. The SSD controller 401 of the second external storage device 106 executes the pulled NVMe command. After completing the command processing, the SSD controller 401 of the second external storage device 106 writes a command processing completion to the second CQ 331 for the second external storage device 106 of the bridge device 104.

When execution of all commands that should be executed by the second external storage device 106 has been completed, the SSD controller 401 of the second external storage device 106 uses the MSI to notify the bridge device 104 that the execution of all the commands has been completed. The SSD controller 401 of the second external storage device 106 reads, by a read access, a second instruction stored in the second SQ 328, which is a second instruction storage of the bridge device 104, and executes the same.

The SSD controller 401 of the second external storage device 106 accesses the storage area of the host controller 103 to perform input and output of data between the host controller 103 and the SSD which is the second external storage device 106. In the step S905, the bridge CPU 301 determines whether or not there has been an interrupt indicating completion of the command processing (completion interrupt) from the first external storage device 105. When there has not been the completion interrupt, the bridge CPU 301 repeats the process in the step S905.

When there has been the completion interrupt, the bridge CPU 301 sets the command notification flag 1003 for the first external storage device 105 in the command processing list to off (0), and the process proceeds to step S906. In the step S906, the bridge CPU 301 determines whether or not there has been the completion interrupt from the second external storage device 106. When there has not been the completion interrupt, the bridge CPU 301 repeats the process in the step S906. When there has been the completion interrupt, the bridge CPU 301 sets the command notification flag 1004 for the second external storage device 106 in the command processing list to off (0), and the process proceeds to step S907.

In the step S907, the bridge CPU 301 sequentially writes information on completions of command processing in the first external storage device 105 to the host CQ 208 which is the storage area of the host controller 103. In step S908, by means of the MSI, the bridge CPU 301 notifies the host controller 103 that processing of all the commands for the first external storage device 105 has been completed.

Figure 13:
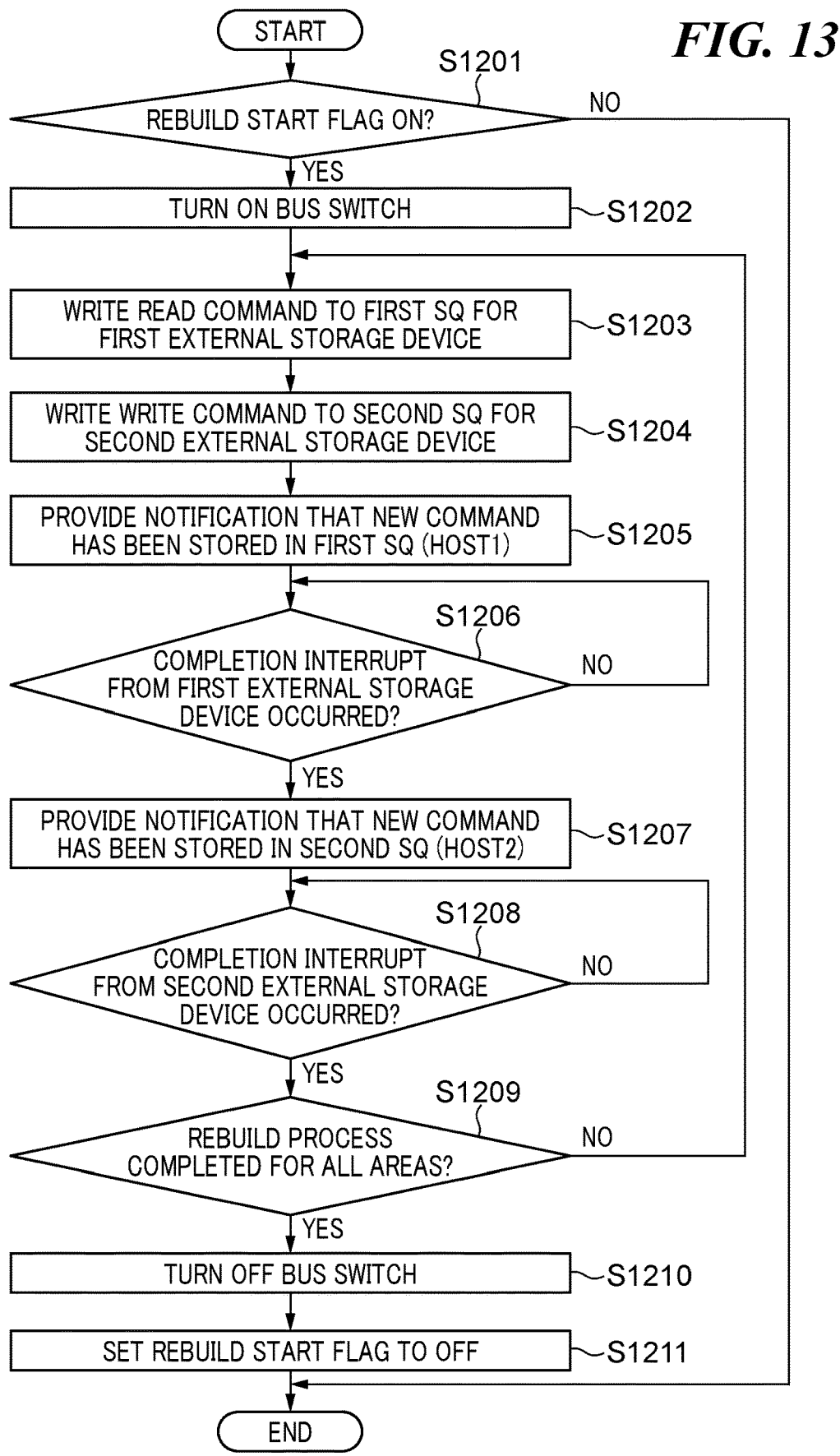
FIG. 13 is a flowchart showing a process which is carried out for the rebuild process by the bridge device according to the first embodiment.

FIG. 13 is a flowchart showing a process which is carried out in the step S1103 in FIG. 6 for the rebuild process by the bridge device 104 according to the first embodiment. In step S1201, the bridge CPU 301 of the bridge device 104 determines whether or not the rebuild start flag stored in the rebuild start flag register 344 is on. The rebuild start flag is set to on in the step S611 in FIG. 7 after the host controller 103 generates a rebuild start command.

When the bridge CPU 301 determines that the rebuild start flag is on, the process proceeds to step S1202. When the rebuild start flag is off, the bridge CPU 301 ends the present process. In the step S1202, the bridge CPU 301 turns on the first bus switch 307 and the second bus switch 308.

The SSD controller 401 of the first external storage device 105 accesses the storage area based on the address map 1303 in FIG. 12C. The SSD controller 401 of the second external storage device 106 accesses the storage area based on the address map 1305 in FIG. 12E. In the address maps 1303 and 1305 in FIGS. 12C and 12E, the rebuild buffer 321 of the bridge device 104 is allocated as a part (1324) of the storage area of the host controller 103.

In step S1203, the bridge CPU 301 stores a read command for the rebuild process in the first SQ 322 of the bridge device 104 for the first external storage device 105. At this time, an initial SLBA (Starting Logical Block Address) is set to the LBA stored in the rebuild area specifying register 343. An NLB (Number Of Logical Blocks) is set to a size of the rebuild buffer 321. A head address of the area 1324 for the rebuild buffer 321 is set as DPTR (Data Pointer).

When an instruction to perform rebuilding from the first external storage device 105 to the second external storage device 106 has been given, a first instruction for writing (or for a write access) which has been generated based on a host instruction (relating to an order from the host controller 103) for the rebuild process is stored in the rebuild buffer 321 which is the first instruction storage. In step S1204, the bridge CPU 301 stores a write command for the rebuild process in the second SQ 328 of the bridge device 104 for the second external storage device 106. Here, the same SLBA, NLB, and DPTR as those in the step S1203 are set.

When an instruction to perform rebuilding from the first external storage device 105 to the second external storage device 106 has been given, a second instruction for reading (or for a read access) which has been generated based on a host instruction for the rebuild process is stored in the rebuild buffer 321 which is the second instruction storage.

In step S1205, by carrying out the same process as in the step S902, the bridge CPU 301 notifies the first external storage device 105 that the new NVMe command has been stored in the first SQ 322 of the bridge device 104. Upon receiving the notification, the SSD controller 401 of the first external storage device 105 independently carries out a pulling process using the read command prepared in the step S1203. The SSD controller 401 of the first external storage device 105 transfers data from the NAND flash memory 404 to the rebuild buffer 321.

When execution of the read command has been completed, the SSD controller 401 of the first external storage device 105 notifies the bridge device 104 of an MSI (completion interrupt) indicating completion of command processing. In step S1206, based on the notification in the step S1205, the bridge CPU 301 determines whether or not the completion interrupt has been issued by the SSD controller 401 of the first external storage device 105. When the completion interrupt has not been issued, the bridge CPU 301 repeats the process in the step S1206. When the bridge CPU 301 determines that the completion interrupt has been issued by the SSD controller 401 of the first external storage device 105, the process proceeds to step S1207.

In the step S1207, by carrying out the same process as in the step S904, the bridge CPU 301 notifies the second external storage device 106 that the new NVMe command has been stored in the second SQ 328 of the bridge device 104. Upon receiving the notification, the SSD controller 401 of the second external storage device 106 independently carries out a writing process using the write command prepared in the step S1204. The SSD controller 401 of the second external storage device 106 receives data from the rebuild buffer 321 and writes the same into the NAND flash memory 404.

When execution of the write command has been completed, the SSD controller 401 of the second external storage device 106 notifies the bridge device 104 of an MSI (completion interrupt) indicating completion of command processing. In step S1208, based on the notification in the step S1207, the bridge CPU 301 determines whether or not the completion interrupt has been issued by the SSD controller 401 of the second external storage device 106. When the completion interrupt has not been issued, the bridge CPU 301 repeats the process in the step S1208. When the bridge CPU 301 determines that the completion interrupt has been issued by the SSD controller 401 of the second external storage device 106, the process proceeds to step S1209.

In the step S1209, the bridge CPU 301 determines whether or not the rebuild process has been completed for all areas specified by the rebuild area specifying register 343. When the bridge CPU 301 determines that the rebuild process has not been completed for all the areas, the process returns to the step S1203. When the bridge CPU 301 determines that the rebuild process has been completed for all the areas, the process proceeds to step S1210.

For example, assume that sector size information included in the rebuild area specifying register 343 indicates 100 sectors, and the rebuild buffer 321 has a buffer capacity for 20 sectors. In this case, the bridge CPU 301 repeatedly carries out the processes from the step S1203 to the step S1209 five times. The SLBA included in the read/write command written into the SQ in the step S1203 and the step S1204 is incremented by 20 sectors which is the buffer capacity of the rebuild buffer 321 each time the process is carried out.

In the step S1210, the bridge CPU 301 turns off the first bus switch 307 and the second bus switch 308. As a result, the PCIe address map referred to is switched again to the one in FIGS. 12B and 12D. An address allocated to the rebuild buffer 321 in the rebuild process goes back to the original storage area of the host controller 103. In the step S1211, the bridge CPU 301 sets the rebuild start flag stored in the rebuild start flag register 344 to off. This completes the rebuild process.

It should be noted that the rebuild process in which data is copied from the first external storage device 105 to the second external storage device 106 is taken as an example in explaining the flowchart of FIG. 13. There may be cases where the bridge CPU 301 carries out a rebuild process in which data is copied from the second external storage device 106 to the first external storage device 105. In these cases, the rebuild process has only to be a process in which in FIG. 13, the first external storage device 105 and the second external storage device 106 are interchanged, and also Host1 and Host2 are interchanged.

As described above, in the present embodiment, the host controller 103 issues a host instruction to carry out the rebuild process for mirroring between the first external storage device 105 and the second external storage device 106. In this case, the bridge device 104 causes one of the external storage devices, which is about to write data for the rebuild process to the storage area of the host controller, to write the data to the rebuild buffer 321 provided in the rebuild buffer 321.

The bridge device 104 also causes the other one of the external storage devices, which is about to read data for the rebuild process from the storage area of the host controller, to read the data from the rebuild buffer 321 provided in the rebuild buffer 321. The first bus switch 307 and the second bus switch 308 manage the storage area of the rebuild buffer 321 as a part of an address space in a storage area which is different from the storage area of the host controller 103 and can be accessed by each SSD controller 401. The first bus switch 307 and the second bus switch 308 set the access destination of each SSD controller 401 to the rebuild buffer 321 when each SSD controller 401 accesses an address in the storage area of the rebuild buffer 321.

As described above, in the image forming apparatus 100 according to the present embodiment, the rebuild process can be implemented even with SSDs of the new type which are external storage devices each of which implements data input and output to and from the host controller 103 by accessing the storage area of the host controller 103. In the present embodiment, the rebuild process for restoring mirroring can be implemented, while taking advantage of high-speed data transfer using the NVMe protocol, without imposing high processing load on the host controller 103. In the present embodiment, the bridge device 104 which constitutes the mirroring system using the NVMe protocol is caused to carry out the rebuild process.

In the embodiment described above, to carry out the rebuild process, the bridge device 104 switches the first bus switch 307 and the second bus switch 308 from the off state to the on state. As a result, a part of the original storage area in the host controller 103 is replaced with the storage area of the rebuild buffer 321 in the bridge device 104. The first external storage device 105 or the second external storage device 106 is able to access the rebuild buffer 321 in the bridge device 104 though the same process as in the case where they access the storage area of the host controller 103. The first external storage device 105 and the second external storage device 106 execute a read command and a write command to perform data copying for the rebuild process as in the same manner as in the case where they access the storage area of the host controller 103.

A description will now be given of the image forming apparatus 100 according to a second embodiment of the present invention. In the present embodiment, when the rebuild process is to be carried out, the bridge device 104 enables data copying for the rebuild process without switching the first bus switch 307 and the second bus switch 308 between the off state and the on state.

Figure 14:
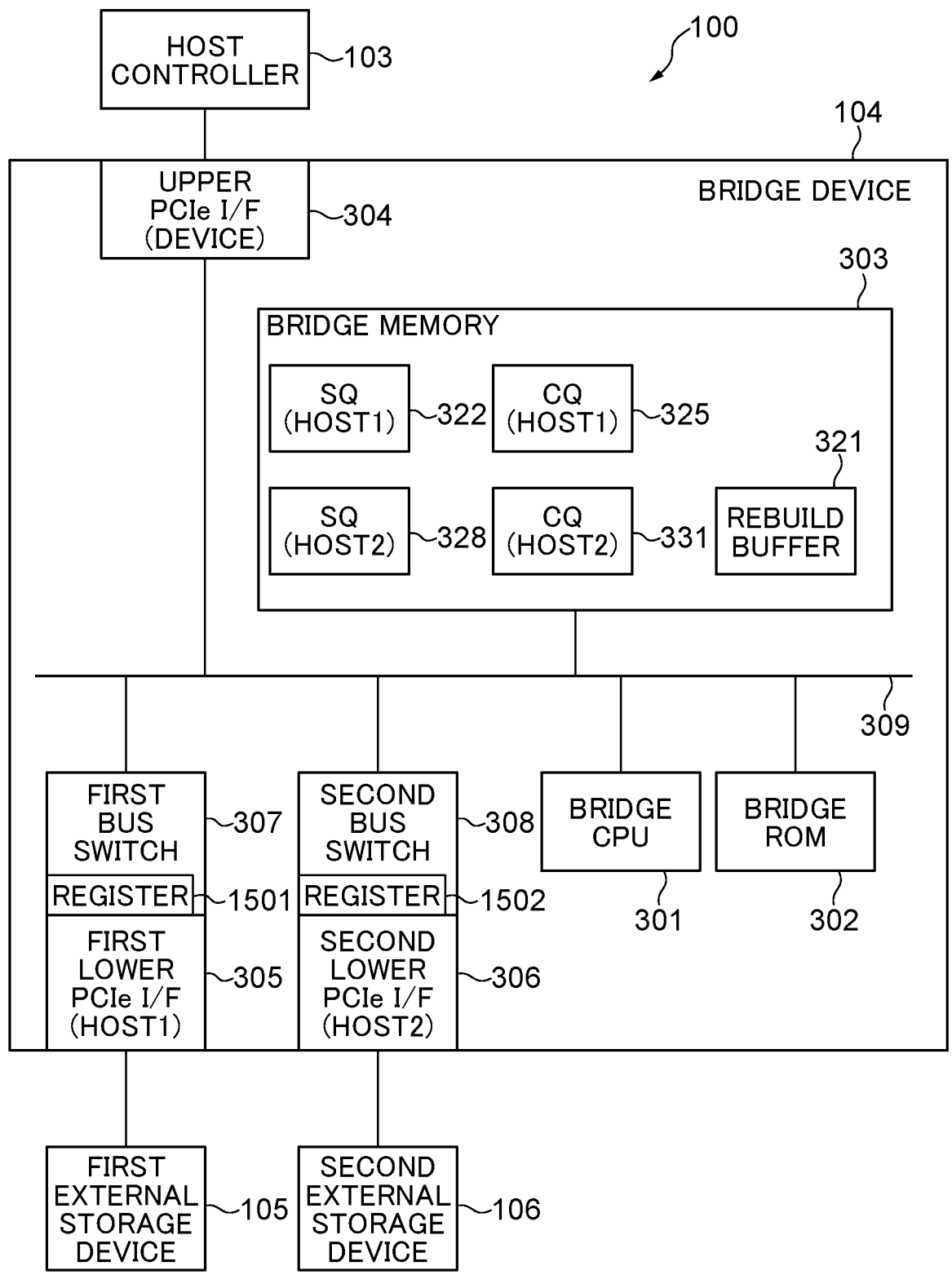
FIG. 14 is a diagram showing an arrangement of a bridge device according to a second embodiment.

FIG. 14 is a diagram showing an arrangement of the bridge device 104 according to the second embodiment. In the bridge device 104 in FIG. 14, the first bus switch 307 has a first area setting register 1501. The second bus switch 308 has a second area setting register 1502. FIGS. 15A, 15B, and 15C are views useful in explaining PCIe address maps related to PCIe interfaces (Device, Host1, Host2) of the bridge device 104 according to the second embodiment. FIG. 15A shows the address map 1301 for the original storage area of the host controller 103, which is the same as in FIG. 12A.

FIG. 15B shows an address map 1302' for a storage area on the bridge device 104 as seen from the SSD controller 401 of the first external storage device 105. In the storage area of the bridge device 104 in FIG. 15B, a storage area (an area above a dotted line 1602 in FIG. 15) provided by the first area setting resister 1501 is added to the original storage area of the host controller 103 (FIG. 15A). When a storage area of the bridge device 104 is allocated as the storage area provided by the first area setting resister 1501, the storage area of the rebuild buffer 321 is always allocated (1601). When the SSD controller 401 of the first external storage device 105 accesses the storage area provided by the first area setting resister 1501, the first bus switch 307 changes its access destination from the storage area of the host controller 103 to the rebuild buffer 321.

FIG. 15C shows an address map 1304' for a storage area on the bridge device 104 as seen from the SSD controller 401 of the second external storage device 106. In the storage area of the bridge device 104 in FIG. 15C, a storage area (an area above the dotted line 1602 in FIG. 15) provided by the second area setting resister 1502 is added to the original storage area of the host controller 103 (FIG. 15A). When a storage area of the bridge device 104 is allocated as the storage area provided by the second area setting resister 1502, the storage area of the rebuild buffer 321 is always allocated (1601). When the SSD controller 401 of the second external storage device 106 accesses the storage area provided by the second area setting resister 1502, the second bus switch 308 changes its access destination from the storage area of the host controller 103 to the rebuild buffer 321.

Figure 16:
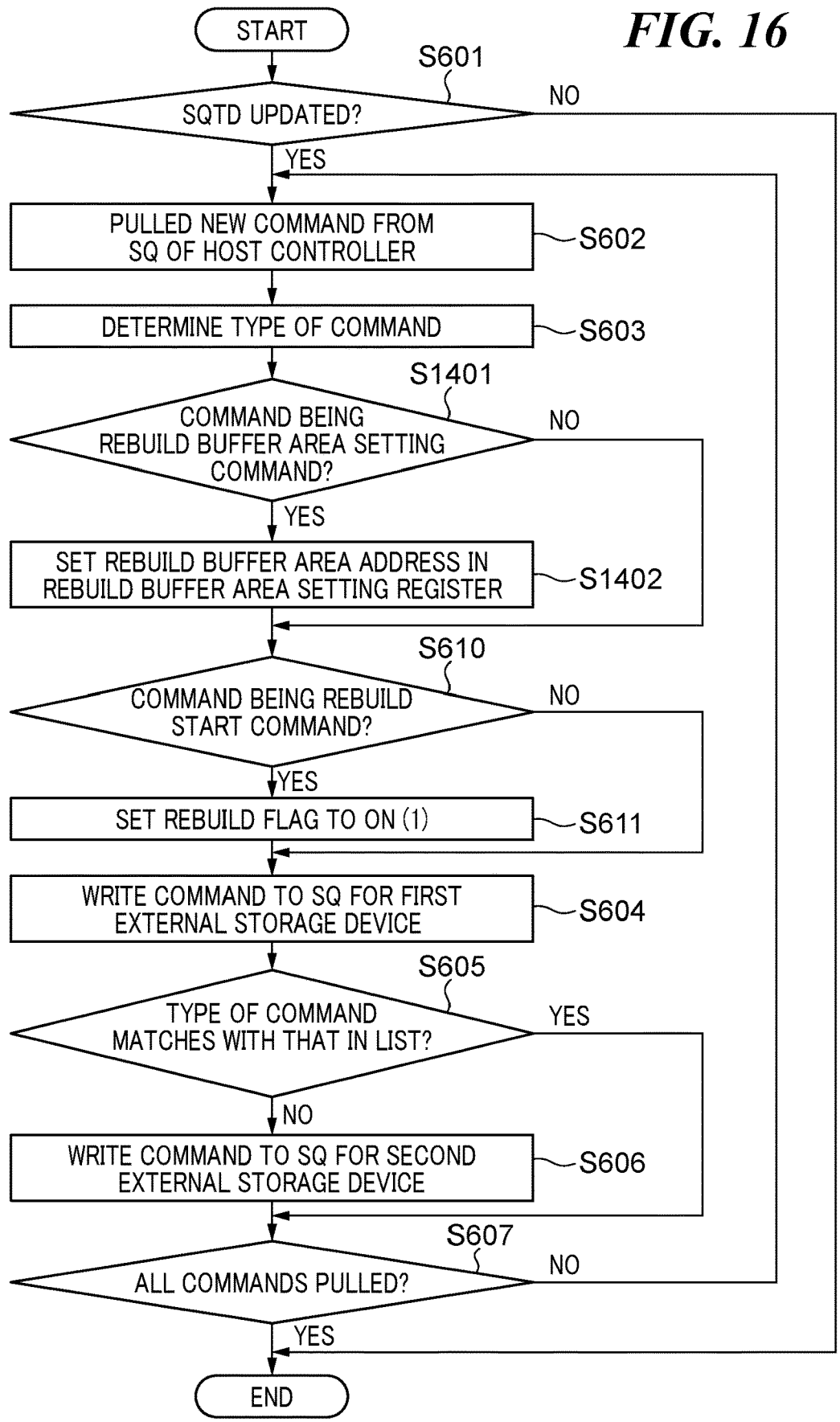
FIG. 16 is a flowchart showing a process which is carried out for the rebuild process by the bridge device according to the second embodiment.

FIG. 16 is a flowchart showing the process which is carried out in the step S1101 in FIG. 6 for the rebuild process by the bridge device 104 according to the second embodiment. Referring to FIG. 16, as distinct from FIG. 7, the bridge CPU 301 of the bridge device 104 determines a type of a command pulled in the step S603, and then the process proceeds to step S1401.

In the step S1401, the bridge CPU 301 determines whether or not the pulled command is a command which gives an instruction to set the rebuild buffer 321 area. When the bridge CPU 301 determines that the pulled command is the command which gives the instruction to set the rebuild buffer 321 area, the process proceeds to step S1402. When the bridge CPU 301 determines that the pulled command is not the command which gives the instruction to set the rebuild buffer 321 area, the process proceeds to the step S610.

In the step S1402, the bridge CPU 301 sets the rebuild buffer area 321 in the first/second area setting register 1501, 1502. As a result, the storage area of the bridge device 104 as seen from the SSD controller 401 of the first external storage device 105 is one shown by the address map 1302' in FIG. 15B. The storage area of the bridge device 104 as seen from the SSD controller 401 of the second external storage device 106 is one shown by the address map 1304' in FIG. 15C. After that, the process proceeds to the step S610.

Figure 17:
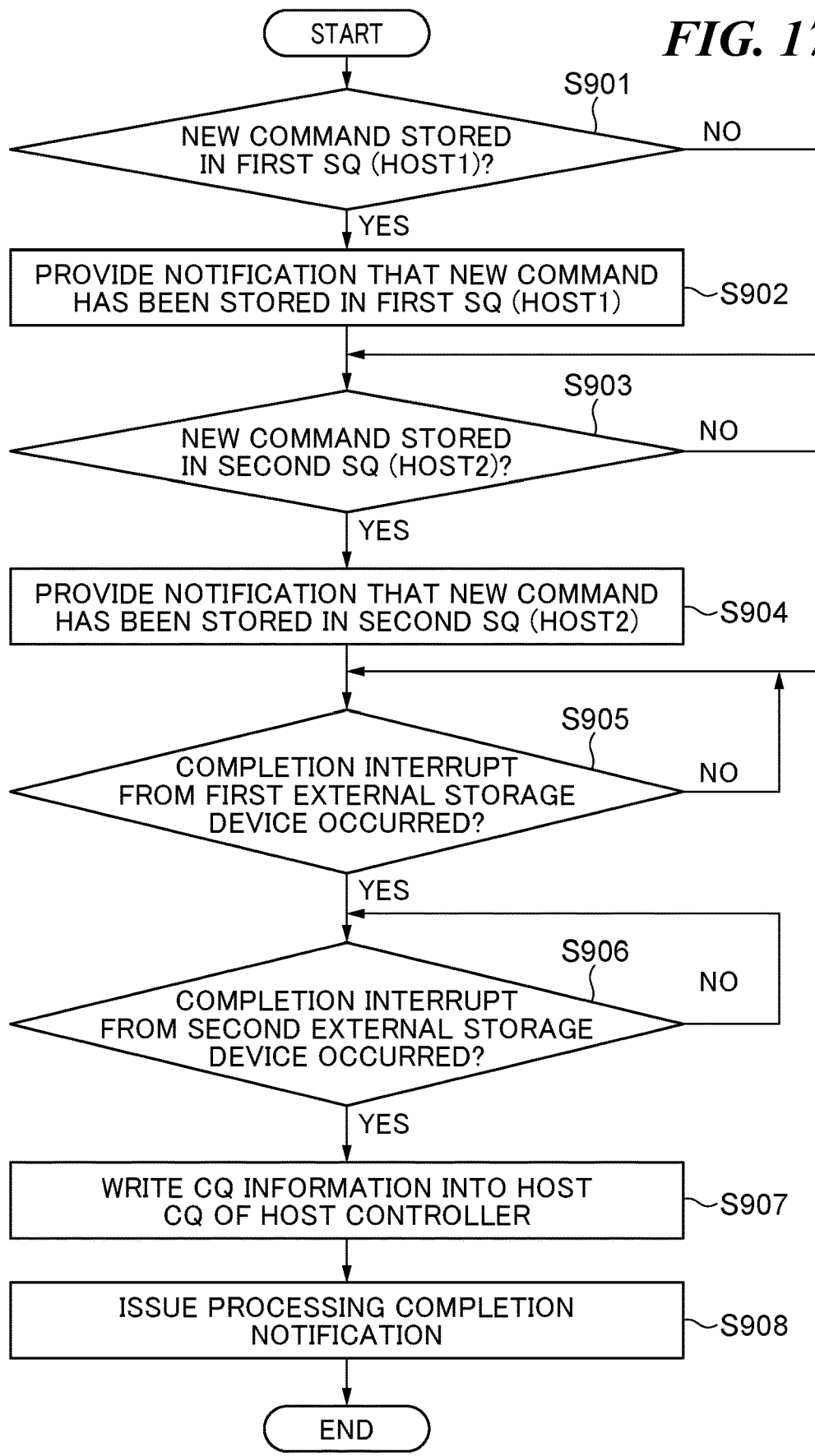
FIG. 17 is a flowchart showing a process which is carried out for the rebuild process by the bridge device according to the second embodiment.

FIG. 17 is a flowchart showing the process which is carried out in the step S1102 in FIG. 6 for the rebuild process by the bridge device 104 according to the second embodiment. Referring to FIG. 17, as distinct from FIG. 10, the bridge CPU 301 of the bridge device 104 starts with the process in the step S901. The bridge CPU 301 carries out the processes in the step S901 and the subsequent steps without switching the bus switches 307 and 308 in the step S920 in FIG. 10.

Figure 18:
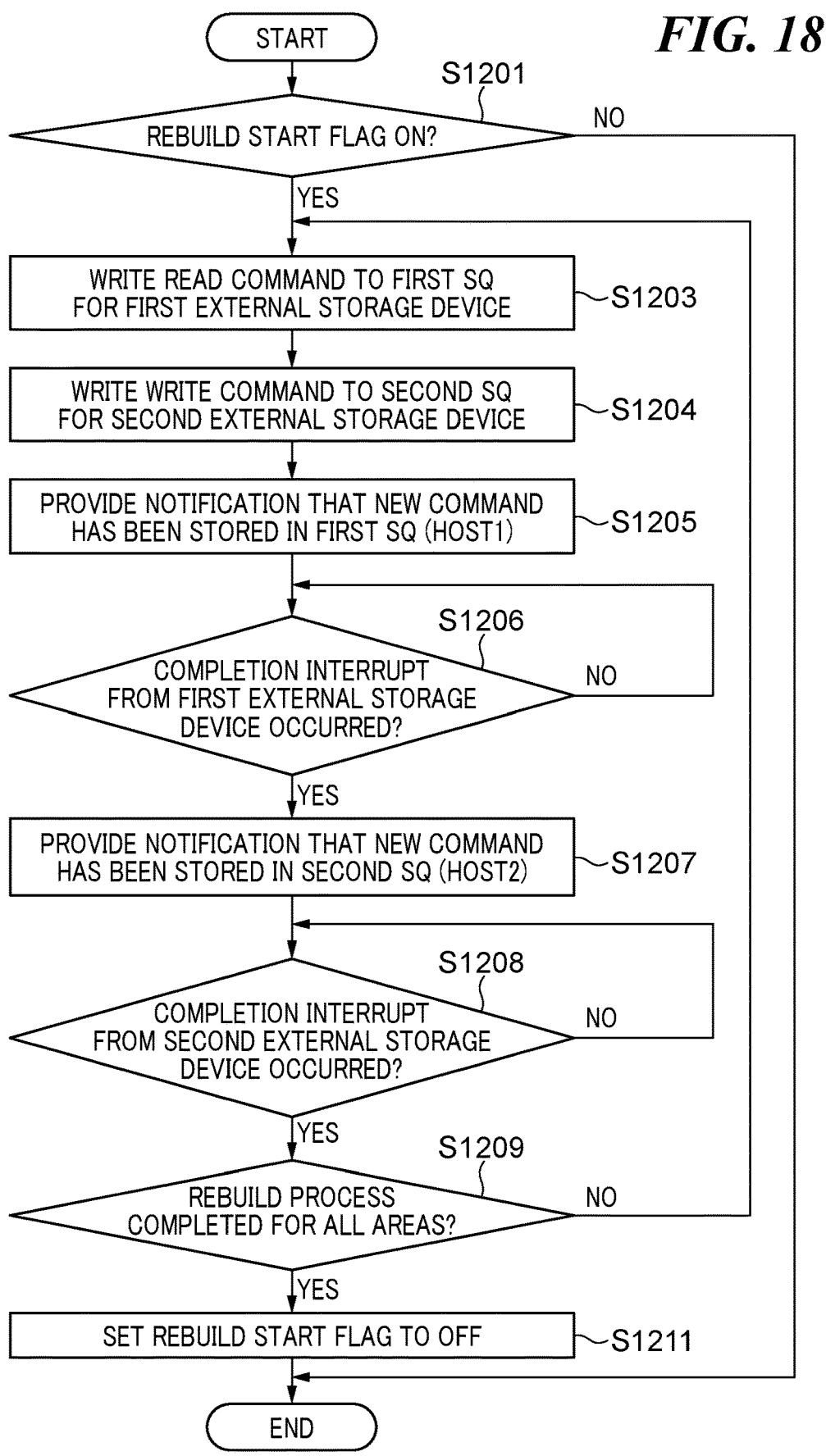
FIG. 18 is a flowchart showing a process which is carried out for the rebuild process by the bridge device according to the second embodiment.

FIG. 18 is a flowchart showing a process which is carried out in the step S1103 in FIG. 6 for the rebuild process by the bridge device 104 according to the second embodiment. Referring to FIG. 18, as distinct from FIG. 13, when the bridge CPU 301 of the bridge device 104 determines in the step S1201 that the rebuild start flag is on, the process proceeds to the step S1203. When the bridge CPU 301 determines in the step S1209 that the rebuild process has been completed for all the areas, the process proceeds to step S1211. Thus, the bridge CPU 301 carries out the rebuild process without carrying out the process in the step S1202 or the process in the step S1210 in FIG. 13. Namely, the bridge CPU 301 carries out the rebuild process without carrying out the process to switch the bus switch 307 or 308.

As described above, in the present embodiment, the storage area of the rebuild buffer 321 is managed, by the first/second bus switch 307, 308, as a part of the address space in the storage area of the host controller 103 which cannot be accessed by the SSD controller 401. Thus, the SSD controller 401 of the first external storage device 105 accesses the storage area of the bridge device 104 through the first bus switch 307. When the access destination of the first external storage device 105 is the rebuild buffer 321, the first bus switch 307 causes the first external storage device 105 to access the rebuild buffer 321, without being switched. Likewise, the SSD controller 401 of the second external storage device 106 accesses the storage area of the bridge device 104 through the second bus switch 308. When the access destination of the second external storage device 106 is the rebuild buffer 321, the first bus switch 307 causes the second external storage device 106 to access the rebuild buffer 321, without being switched. As a result, data for the rebuild process can be copied between the first external storage device 105 the second external storage device 106.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-003817, filed Jan. 14, 2020, which is hereby incorporated by reference herein in its entirety.

What is claimed is:

1. A control method for an information processing apparatus comprising a host controller including a storage area, a plurality of external storage devices, and a bridge device connected to the plurality of external storage devices and including a buffer configured to store data for a rebuild process where data in one external storage device, among the plurality external storage devices, is copied to another external storage device, among the plurality of external storage devices, and a bus switch associated with each of the plurality of external storage devices and configured to switch destination of input and output of data by the respective external storage device between the storage area of the host controller and the buffer, the control method comprising:

the plurality of external storage devices, in accessing the storage area of the host controller via the bridge device, performing input and output of data to and from the host controller without using the buffer;

the plurality of external storage devices, in accessing the buffer of the bridge device, performing input and output of data to and from the buffer without using the storage area of the host controller;

the bridge device, with the bus switches associated with the plurality of external storage devices, setting destination of the input and output of data by the plurality of external storage devices to the storage area of the host controller, in a state where the host controller has not issued a host instruction to carry out the rebuild process for mirroring between the plurality of external storage devices; and the bridge device, with the bus switches, setting the destination of the input and output of data by the plurality of external storage devices to the buffer of the bridge device, in a state where the host controller has issued the host instruction to carry out the rebuild process for mirroring between the plurality of external storage devices.

2. An information processing apparatus comprising:
a host controller including a storage area;
a plurality of external storage devices; and
a bridge device connected to the plurality of external storage devices and includes:
  a buffer configured to store data for a rebuild process where data in one external storage device, among the plurality of external storage devices, is copied to another external storage device, among the plurality of external storage devices; and
  a bus switch associated with each of the plurality of external storage devices and configured to switch destination of input and output of data by the respective external storage device between the storage area of the host controller and the buffer,
wherein the plurality of external storage devices in accessing:
  the storage area of the host controller via the bridge device, perform input and output of data to and from the host controller without using the buffer; and
  the buffer of the bridge device, perform input and output of data to and from the buffer without using the storage area of the host controller,
wherein the bridge device, with the bus switches associated with the plurality of external storage devices, sets destination of the input and output of data by the plurality of external storage devices to:
  the storage area of the host controller, in a state where the host controller has not issued a host instruction to carry out the rebuild process for mirroring between the plurality of external storage devices; and
  the buffer of the bridge device, in a state where the host controller has issued the host instruction to carry out the rebuild process for mirroring between the plurality of external storage devices.

3. The information processing apparatus according to claim 2, wherein:
each of the plurality of external storage devices includes a controller configured to execute an instruction related to an order from the host controller and try to access the storage area of the host controller through the bridge device, and
the bus switch associated with the one external storage device, in a state where the controller of the one external storage device tries to access the storage area of the host controller for the rebuild process, switches an access destination of the controller of the one external storage device from the storage area of the host controller to the buffer of the bridge device.

4. The information processing apparatus according to claim 2, wherein each of the plurality of external storage devices inputs and outputs data to and from the host controller by accessing the storage area of the host controller through the bridge device using a Non-Volatile Memory Express protocol.

5. The information processing apparatus according to claim 3, wherein the bus switch associated with the one external storage device:
manages a storage area of the buffer as a part of an address space in a storage area that is different from the storage area of the host controller and that is accessible by the controller of the one external storage device; and
switches an access destination of the controller of the one external storage device to the buffer, in a state where the controller of the one external storage device is accessing an address in the storage area of the buffer.

6. The information processing apparatus according to claim 3, wherein the bus switch associated with the one external storage device:
manages a storage area of the buffer as a part of an address space in a storage area of the host controller that is not accessible by the controller of the one external storage device; and
switches an access destination of the controller of the one external storage device to the buffer, in a state where the controller of the one external storage device is accessing an address in the storage area of the buffer.

7. The information processing apparatus according to claim 3, wherein:
the bridge device further comprises:
  a first instruction storage configured to store a first instruction that is generated based on a host instruction relating to an order from the host controller and executed by the controller of the one external storage device; and
  a second instruction storage configured to store a second instruction that is generated based on a host instruction relating to an order from the host controller and executed by the controller of the another external storage device,
by reading and executing the first instruction stored in the first instruction storage, the controller of the one external storage device accesses the storage area of the host controller and implements data input and output between the host controller and the one external storage device, and
by reading and executing the second instruction stored in the second instruction storage, the controller of the another external storage device accesses the storage area of the host controller and implements data input and output between the host controller and the another external storage device.

8. The information processing apparatus according to claim 7, wherein, in a state where the host controller has issued a host instruction to carry out the rebuild process for mirroring;
the first instruction, which is stored in the first instruction storage, is generated based on the host instruction for the rebuild process, and is a write access instruction for instructing the controller of the one external storage device, where the data for mirroring is stored, to write the data to the storage area of the host controller; and
the second instruction, which is stored in the second instruction storage, is generated based on the host instruction for the rebuild process and is a read access instruction for instructing the controller of the another external storage device to read data from the storage area of the host controller.

9. The information processing apparatus according to claim 2, wherein, in the state where the host controller has issued the host instruction to carry out the rebuild process for mirroring, the bridge device causes:
the one external storage device to write data to the buffer of the bridge device, and
the another external storage device to read the data from the buffer of the bridge device.

* * * * *